(12) United States Patent
van de Ruit et al.

(10) Patent No.: US 11,139,979 B2
(45) Date of Patent: Oct. 5, 2021

(54) PRIMARY AND SECONDARY BLOCKCHAIN DEVICE

(71) Applicant: Koninklijke KPN N.V., Rotterdam (NL)

(72) Inventors: Douwe van de Ruit, Langerak (NL); Nikos Moustakas, Nootdorp (NL)

(73) Assignee: Koninklijke KPN N.V., Rotterdam (NL)

(*) Notice: Subject to any disclaimer, the term of this patent is extended or adjusted under 35 U.S.C. 154(b) by 180 days.

(21) Appl. No.: 16/216,707

(22) Filed: Dec. 11, 2018

(65) Prior Publication Data
US 2019/0190719 A1    Jun. 20, 2019

(30) Foreign Application Priority Data

Dec. 18, 2017 (EP) .................................... 17207913

(51) Int. Cl.
*H04L 9/32* (2006.01)
*H04L 9/06* (2006.01)
*G06F 21/64* (2013.01)
*H04L 9/12* (2006.01)

(52) U.S. Cl.
CPC ............ *H04L 9/3236* (2013.01); *G06F 21/64* (2013.01); *H04L 9/0637* (2013.01); *H04L 9/0643* (2013.01); *H04L 9/12* (2013.01); *H04L 9/3239* (2013.01); *H04L 2209/38* (2013.01)

(58) Field of Classification Search
CPC ... H04L 9/3236; H04L 9/3239; H04L 9/0637; H04L 9/12; H04L 9/0643; H04L 2209/38; G06F 21/64
See application file for complete search history.

(56) References Cited

U.S. PATENT DOCUMENTS

| 9,774,578 | B1 | 9/2017 | Ateniese et al. |
| 10,305,833 | B1* | 5/2019 | Dennis ..................... H04L 51/12 |
| 10,554,649 | B1* | 2/2020 | Fields ................... H04L 9/3263 |
| 2016/0028552 | A1* | 1/2016 | Spanos ................. H04L 9/3236 |
| | | | 713/178 |
| 2016/0330034 | A1* | 11/2016 | Back ...................... H04L 9/3255 |
| 2017/0005804 | A1* | 1/2017 | Zinder ................ G06F 21/6254 |

(Continued)

FOREIGN PATENT DOCUMENTS

| EP | 3 499 789 A1 | 6/2019 |
| WO | WO 2019/072670 A1 | 4/2019 |
| WO | WO 2019/077126 A1 | 4/2019 |

OTHER PUBLICATIONS

Adam Back et al. Enabling Blockchain innovations with Pegged Sidechains Oct. 22, 2014 (Year: 2014).*

(Continued)

*Primary Examiner* — Cheng-Feng Huang
(74) *Attorney, Agent, or Firm* — Hamilton, Brook, Smith & Reynolds, P.C.

(57) ABSTRACT

Some embodiments are directed to a blockchain verification method for a secondary blockchain, the blockchain verification method including sending an activation transaction to a primary blockchain management device which is configured to manage the primary blockchain. The primary blockchain management device is configured to execute a smart contract based on input in the activation transaction generating a result, and publish the result on the primary blockchain.

10 Claims, 9 Drawing Sheets

(56) References Cited

U.S. PATENT DOCUMENTS

| | | | |
|---|---|---|---|
| 2017/0031676 A1 | 2/2017 | Cecchetti et al. | |
| 2017/0230189 A1* | 8/2017 | Toll | H04L 9/3247 |
| 2017/0323294 A1* | 11/2017 | Rohlfing | G06Q 20/401 |
| 2017/0331896 A1 | 11/2017 | Holloway et al. | |
| 2017/0344988 A1* | 11/2017 | Cusden | G06F 21/00 |
| 2019/0026821 A1* | 1/2019 | Bathen | G06Q 40/00 |
| 2019/0058719 A1* | 2/2019 | Kar | H04L 9/3239 |
| 2019/0130387 A1* | 5/2019 | Arora | G06Q 30/0207 |
| 2020/0258085 A1 | 8/2020 | Moustakas | |
| 2020/0389294 A1* | 12/2020 | Soundararajan | G06Q 20/36 |

OTHER PUBLICATIONS

Solidity Documentation Release 0.4.19, Ethereum (Dec. 2017).
Adam Back, et al., "Enabling Blockchain Innovations with Pegged Sidechains," (Oct. 22, 2014).
European Search Report for EP 17 207 913.9, dated Jun. 11, 2018.
Tschorsch, F., et al., "Bitcoin and Beyond: A Technical Survey on Decentralized Digital Currencies," International Association for Cryptologic Research, vol. 20150517:090557, May 15, 2015.
Ateniese, G. et al., "Redactable Blockchain—or—Rewriting History in Bitcoin and Friends," 2017 IEEE European Symposium on Security and Privacy, IEEE, pp. 111-126 (Apr. 26, 2017).
Extended European Search Report issued for European Application No. 18212902, entitled "Primary and Secondary Blockchain Device," dated Apr. 17, 2019.
Communication Pursuant to Article 94(3) EPC, Examination Report issued for European Application No. 18212902, entitled "Primary and Secondary Blockchain Device," dated May 15, 2020.

* cited by examiner

PRIMARY AND SECONDARY BLOCKCHAIN DEVICE

RELATED APPLICATION

This application claims priority under 35 U.S.C. § 119 or 365 to European Application No.: 17207913.9, filed Dec. 18, 2017. The entire teachings of the above application are incorporated herein by reference.

TECHNICAL FIELD

The invention relates to a blockchain verification method, a secondary blockchain management method, a secondary blockchain initiation device, a secondary blockchain management device, a smart contract, and a computer readable medium.

BACKGROUND

Blockchains are a novel technology that allows distributed management of transactions while at the same time maintaining trust in those transactions. The latter may also be done in a distributed manner. A blockchain is a list of records, which are called blocks, which are linked. Each block contains a pointer as a link to a previous block. Multiple parties can record transactions in the blockchain or verify previous transactions of others. The blockchain is sometimes referred to as a ledger.

An example of a known blockchain system is given in US Patent Application 20170031676, "Blockchain Computer Data Distribution" (included herein by reference). The known system discloses various uses of such blockchains. For example, blockchains are used in cryptocurrency systems. For example, cryptocurrency transactions for a period may be stored in a block that is then added to the tail of the blockchain, thereby extending the blockchain. The history of the cryptocurrency can be accessed by moving along the blocks of the blockchain. The blockchain could be held privately, e.g., in a centralized manner, or held publicly in a less centralized manner. The latter is usual for cryptocurrencies.

Another example given in the known system, is the distribution of patches to IoT devices through a blockchain environment. In the blockchain environment, blocks, which can hold data, are chained together by storing information in a block which indicates the preceding block. A block can further comprise timestamp information and validation information.

Recently a lot of new blockchain related implementations are created. These implementations provide all kinds of new ways of making transactions between multiple parties, e.g., based on bitcoin or bitcoin type blockchains. Other implementations make use of the immutability characteristic of the blockchain technologies, for example to enable a secure and tamper-proof notary system. From the perspective of the user the blockchain world is changing from clear to cluttered. This imposes new problems, e.g., where multiple blockchains exist in parallel, a verification mechanism is missing to verify the integrity of the data.

SUMMARY

As the blockchain technology evolves, the number of blockchains grows fast. Not only public blockchains, but also private blockchains. Furthermore, the number of applications to which blockchains may be applied is steadily increasing. The user may thus be confronted with various blockchains for various applications. Not all of these blockchain may be particularly well-known, used by many users, or see a lot of traffic. As a result, the user is in need of an additional way to verify the reliability or trustworthiness of a particular blockchain. Apart from verifying the data that is present on a blockchain, a user may also need a reliable way to verify that a blockchain is still being maintained.

A blockchain verification method as defined in the claims addresses these concerns. The blockchain verification method may comprise sending one or more smart contract creation transactions to a primary blockchain management device which may be configured to manage a primary blockchain. The smart contract creation transaction may comprise a smart contract for performing verification of an action on a secondary blockchain. The primary blockchain management device may be configured to publish the smart contract in a block of the primary blockchain. The method may comprise performing the action on the secondary blockchain, e.g., by a blockchain management device or blockchain initiation device.

The method may comprise generating an activation transaction comprising, e.g., a blockchain identifier of the secondary blockchain, information relating to the action, and an identifier of the smart contract on the primary blockchain, etc. The method may comprise sending the activation transaction to a primary blockchain management device which may be configured to manage the primary blockchain. The primary blockchain management device may be configured to execute the smart contract based on input in the activation transaction and may generate a result, and may publish the result on the primary blockchain.

Examples of the actions that can be performed on the secondary blockchain include: the creation of the secondary blockchain, the creation of a new block on the secondary blockchain, the creation of a blockchain address for a user, the cancelation of the secondary blockchain.

In an embodiment, a secondary blockchain is maintained by performing actions on it. For example, the secondary blockchain may be created, used, cancelled, and so on. Information related to these actions cause the activation of a smart contract on the primary blockchain. The smart contract verifies the action and records the result of the verification on the primary blockchain.

For example, if the action is the creation of new blocks on the secondary blockchain, then this may be recorded on a different blockchain: the primary blockchain. The primary blockchain may be maintained by a different device, or devices, and in fact by an entirely different organization. Thus, the user, who may know little of the organization supporting the secondary blockchain, can verify the creation of blocks on the secondary blockchain by inspecting the primary blockchain. Moreover, if the user is unsure if the secondary blockchain is still being maintained, he can verify by inspecting the primary blockchain if blocks are still being created, even if, for some reason, new blocks of the secondary blockchain do not reach him. Knowing if a blockchain is still operational may, for example, be problematic for a permissioned consortium blockchain. Note that the overhead of posting an identification in the primary blockchain is much smaller than, e.g., reposting the entire new block of the secondary blockchain in the new block.

An aspect of the invention concerns a secondary blockchain management method as defined in the claims. The secondary blockchain management device creates a new block for inclusion on the secondary blockchain, but also activates a smart contract on the primary blockchain, so that the secondary blockchain may be verified on the primary blockchain. An aspect of the invention concerns a secondary blockchain initiation device, and a secondary blockchain management device.

The primary and secondary blockchain management devices and secondary blockchain initiation device are electronic devices. The blockchain management, verification and use devices may, e.g., be a set-top box, a computer, etc. A blockchain use device may be a mobile electronic device, in particular the blockchain use device may be a mobile phone.

The methods for blockchains described herein may be applied in a wide range of practical applications. Such practical applications include: crypto currencies, transfer systems such as digital notaries implemented on a blockchain, domain management using blockchains, e.g., as an alternative or in addition to certificates such as TLS or SSL certificates, etc. The invention may also be applied in situations in which no transfer is done. For example, in data recording applications, e.g., for recording sensor values and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a blockchain system, FIG. 1b schematically shows an example of an embodiment of a blockchain system including a blockchain management device, FIG. 2a schematically shows an example of an embodiment of a blockchain, FIG. 2b schematically shows an example of an embodiment of a block, FIG. 2c schematically shows an example of an embodiment of a block, FIG. 2d schematically shows an example of an embodiment of a blockchain, FIG. 2e schematically shows an example of an embodiment of a blockchain, FIG. 2f schematically shows an example of an embodiment of a blockchain, FIG. 3 schematically shows an example of an embodiment of a blockchain system, FIG. 4 schematically shows an example of an embodiment of a blockchain verification device FIG. 5 schematically shows an example of an embodiment of a blockchain use device FIG. 6a schematically shows an example of a flowchart for an embodiment of a blockchain verification method, FIG. 6b schematically shows an example of a flowchart for an embodiment of a secondary blockchain management method, FIG. 6c schematically shows an example of a flowchart for an embodiment of a smart contract for managing a secondary blockchain, FIG. 7a schematically shows a computer readable medium having a writable part comprising a computer program according to an embodiment, FIG. 7b schematically shows a representation of a processor system according to an embodiment, FIG. 8 schematically shows an example of an embodiment of a blockchain system and a website.

Figure 1A:
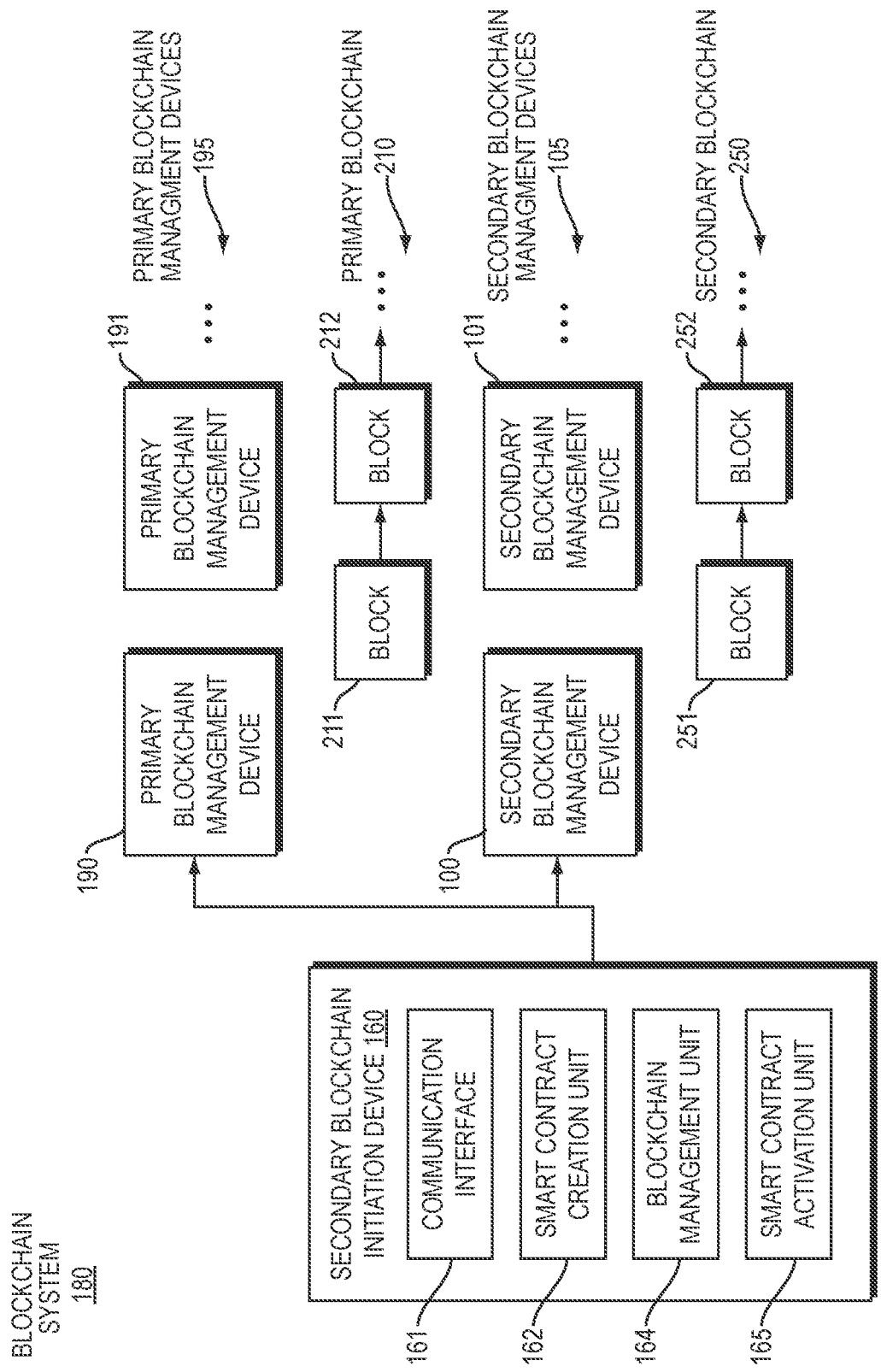

LIST OF REFERENCE NUMERALS IN FIGS. 1a-5, 7a-7b, 8:

100 a secondary blockchain management device
101 a secondary blockchain management device
105 multiple secondary blockchain management devices
110 a communication interface
120 block constructor
125 primary blockchain transaction unit
130 consensus prover
140 a hash unit
150 a computer network
151, 152 blockchain use device
160 a secondary blockchain initiation device
161 a communication interface
162 a smart contract creation unit
164 a blockchain management unit
165 a smart contract activation unit
170 a blockchain verification device
180 a blockchain system
190 a primary blockchain management device
191 a primary blockchain management device
195 multiple primary blockchain management devices
200 a blockchain system
210 a primary blockchain
250 a secondary blockchain
211-215 a block
251-253 a block
220 a block
230 a block
221, 231 a reference to a preceding block
222, 232 multiple transactions
223, 233 a consensus proof
224, 234 a block id
235 an activation transaction
300 a blockchain system
301 a first level
302 a second level
303 a third level
310-370 a blockchain
400 a blockchain use device 410 a communication interface
420 first block obtainer
422 second block obtainer
430 transaction verifier
500 a blockchain verification device
510 a communication interface
520 a verification unit
570 a blockchain storage
800 a website
801-804 a website input interface
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described. In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

Figure 1B:
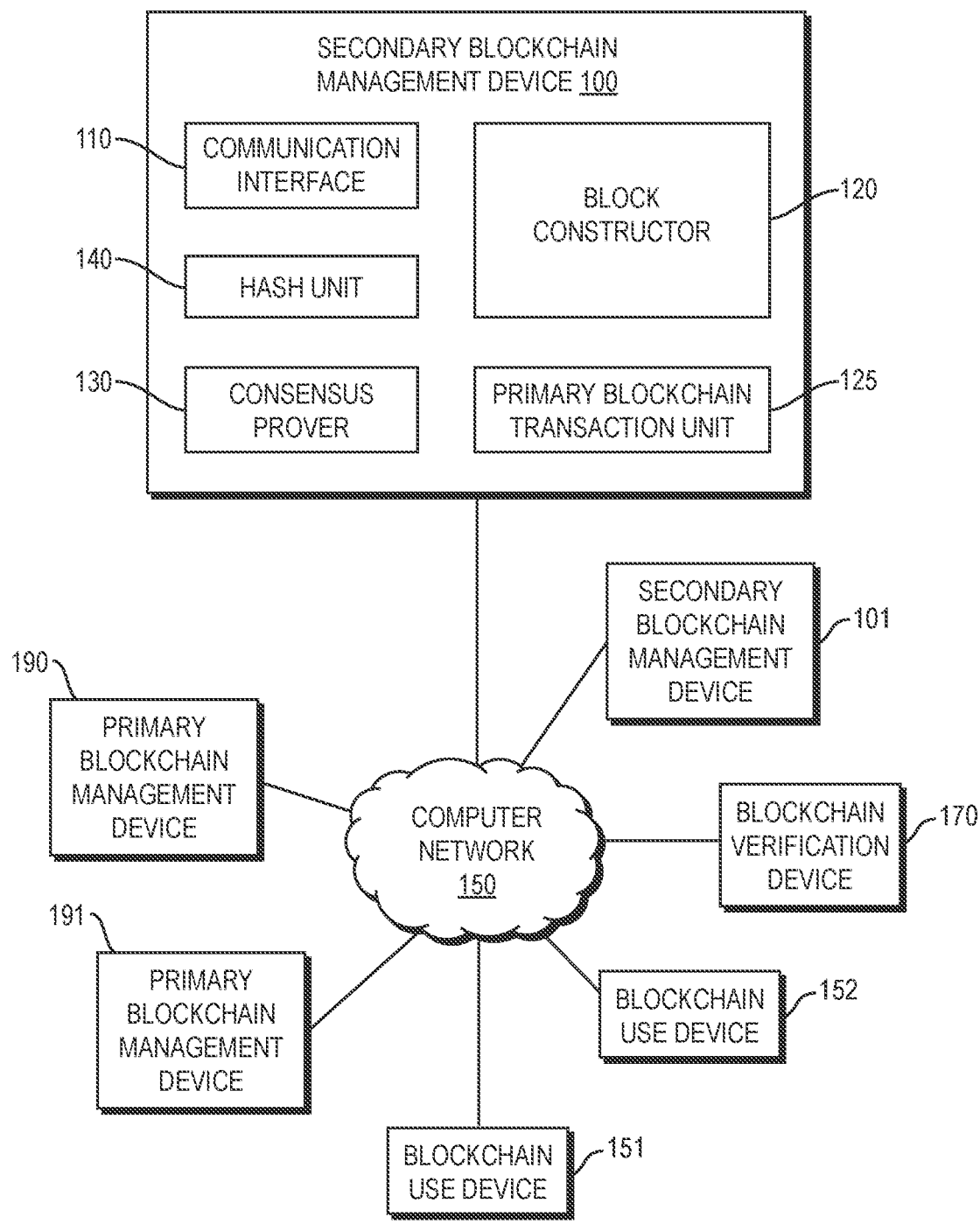

FIG. 1a schematically shows an example of an embodiment of a blockchain system 180. FIG. 1 a comprises a secondary blockchain initiation device 160, which may initiate and/or cancel a secondary blockchain, etc. FIG. 1b schematically shows an example of an embodiment of a blockchain system 180 after it has been created, e.g., by secondary blockchain initiation device 160. In some embodiments, after blockchain system 180 has been created it can run without the secondary blockchain initiation device 160. FIG. 1b shows such a situation, from the perspective of a secondary blockchain management device 100.

Returning to FIG. 1a. Shown are multiple primary blockchain management devices 195, of which are shown primary blockchain management devices 190 and 191. The primary blockchain management devices are configured to maintain a primary blockchain 210. Two blocks, 211 and 212 of the primary blockchain 210 are shown in FIG. 1a. Also shown in FIG. 1a are multiple secondary blockchain management devices 105, of which are shown secondary blockchain management devices 100 and 101.

The secondary blockchain management devices are arranged to add one or more blocks to the secondary blockchain. System 180 uses at least two blockchains, referred to as the primary blockchain and secondary blockchain. Transactions are recorded on the secondary blockchain. Some events on the secondary blockchains are recorded on the primary blockchain. For example, adding a new block to the secondary blockchain may be recorded on the primary blockchain. This feature allows increased verification of the secondary blockchain. In recent years the number of different blockchains has increased rapidly. It has become increasingly harder to verify the trustworthiness of a particular secondary blockchain. However, by recording some features of the secondary blockchain on a primary blockchain, at least these aspects may be verified. For example, a user may have a high trust in the immutability of some particular primary blockchain, e.g., the primary blockchain may be a well-known blockchain such as the bitcoin blockchain, the Ethereum blockchain, etc. Other advantages and applications are discussed further below. There may be multiple blockchains organized hierarchically, wherein a blockchain at a lower hierarchical level records events in a blockchain on a higher hierarchical level, e.g., on the immediately higher level. The highest level blockchain may be referred to as the root blockchain. The primary blockchain may be the root blockchain.

For example, a lower level blockchain, say the secondary blockchain, may be a private blockchain, e.g., for a particular application, a particular company, community or the like, whereas the primary blockchain may be a public blockchain, e.g., the Ethereum blockchain, etc.

The primary blockchain management devices, e.g., devices 190 and 191 are configured to add blocks to a primary blockchain. There may be more than one or two blockchain management devices. For example, there may be more blockchain management devices responsible for the primary or secondary blockchain. There may be devices which are configured both for the primary and secondary blockchain; in other embodiments though a blockchain management device either manages the primary or secondary blockchain but not both. When necessary we will refer to a blockchain management device that adds blocks to a secondary blockchain as a secondary blockchain management device, and a blockchain management device that adds blocks to a primary blockchain as a primary blockchain management device.

Interestingly, the primary blockchain is arranged for so-called smart contracts. The primary blockchain management devices are arranged to execute smart contracts. Smart contracts may be used to manage the second blockchain in various ways. System 180 uses smart contracts to make creating, maintaining and/or verifying the secondary blockchains easier. A smart contract comprises programming instructions which are executed at a blockchain management device. A smart contract can be recorded or posted to a block chain by sending a suitable transaction, e.g., a smart contract creation transaction, to the blockchain management device. An effect of sending a smart contract creation transaction to a blockchain management device is that the smart contract becomes visible in a block of the blockchain.

Execution of a smart contract can be triggered by various events, which may be defined in the smart contract. Typically, a smart contract is triggered by off-chain devices, also known as oracles. In particular, a smart contract may be activated by an activation transaction. For example, the activation transaction may identify the smart contract which is to be executed, and may also provide inputs for the smart contract.

For example, an oracle, in the context of blockchains and smart contracts, may be an agent that finds and verifies real-world occurrences and submits this information to a blockchain to be used by smart contracts. Smart contracts are only executed if certain pre-defined conditions are met. When the condition is met, the smart contract changes its state and executes the programmatically predefined algorithms, automatically triggering an event on the blockchain. Oracles provide these values to the smart contract in a secure and trusted manner.

An oracle may be a data feed, e.g., provided by third party service, designed for use in smart contracts on the blockchain. Oracles provide external data and trigger smart contract executions when pre-defined conditions are met. Such condition could be the creation of a new block on a secondary blockchain, the request for the creation or cancellation of a blockchain, the request for a new address, etc. For example, a particular, or all secondary blockchain management devices, and/or the secondary blockchain initiation device may act as an oracle.

For example, the oracle may send the activation transaction to a blockchain management device, the blockchain management device will execute the smart contract. Generally, speaking the oracle may provide the activation transaction in a different manner, e.g., by providing a publicly accessibly data feed. For example, the oracle may send the activation transaction to a blockchain management device which is configured to execute the smart contract.

The result and/or the activation transaction are recorded in a block of the blockchain. Typically, an activation transaction will be received by more than one blockchain management device, and may thus be executed multiple times. However, only one smart contract result is recorded in the blockchain, namely the result in the block of the blockchain management device that gets incorporated in the blockchain.

In general, smart contracts may be used as follows. During a set-up phase, one or more smart contract creation transactions are sent to a primary blockchain management device, such as primary blockchain management devices 190 or 191. The primary blockchain management devices are arranged to manage primary blockchain 210. The primary blockchain management devices are arranged to receive transactions, and create new blocks for inclusion in primary blockchain 210. The primary blockchain management devices are also arranged for smart contracts. This means that they are arranged to receive smart contract creation transactions. A smart contract creation transaction defines a smart contract. A smart contract may be written in a programming language. This may be a special purpose language. Or a general-purpose language.

For example, a smart contract for the Ethereum blockchain may be written in the language Solidity, see, e.g., "Solidity Documentation", Release 0.4.19, Ethereum, Nov. 27, 2017. There are however limitations in the Solidity language. This may be resolved by off-chain devices, e.g., by a secondary blockchain initiation device or a secondary blockchain management device. For example, these devices may perform the actions on the secondary blockchain themselves. For instance, the transaction in which the identification of a further blockchain is written in the root blockchain will be triggered by an off-chain software program. Smart contracts may also be written in other languages however. For example, other blockchain implementations such as NEO or Stratis, support languages such as C # and Java. Using such more general-purpose language, even a blockchain management device, in particular a secondary blockchain management device, can be implemented as a smart contract. It turns out that this has many advantages, and is further discussed below.

Note that a smart contract may run on each primary blockchain management device, although only one primary blockchain management device will actually be able to effectuate the outcome on the primary blockchain using mining/minting process, e.g., as is done for normal transactions. Further details are given at FIG. 6c. Nevertheless, management device functions such as user login, KYC ('known you customer'), GUI, will still be implemented outside of blockchain smart contract. For example, a portal, e.g., running on device 160 may interact with a smart contract instead of being a smart contract itself.

The smart contract that may be defined by the smart contract creation transaction, e.g., comprised in a smart contract, configured to verify an action on a secondary blockchain. There are various actions that may be performed on the secondary blockchain, examples of which are given herein. The primary blockchain management device is configured to publish the smart contract in a block of the primary blockchain. Typically, the smart contract creation transaction is distributed to multiple primary blockchain management devices, e.g., through a peer-to-peer network. All the primary blockchain management devices then try to create a block with the smart contract in it. One of the primary blockchain management devices will succeed to get his new block with the smart contract to be part of the primary blockchain 210.

Sending the smart contracts creation transactions may be done by secondary blockchain initiation device 160, but it may also be done by a dedicated smart contract device which is used only during the set-up phase. Sending the smart contract creation transactions may also be done by a secondary blockchain management device, which has additional functionality for setting up the smart contracts in the primary blockchain.

After the set-up phase, say during an execution phase, the action on the secondary blockchain is performed. There may be overlap between the set-up phase and the execution phase. In some embodiments, the action is performed by a device, such as the secondary blockchain initiation device 160 or a secondary blockchain management device. The action could also be performed by a dedicated device which is independent from the secondary blockchain initiation device 160 and the secondary blockchain management device, e.g., a verification device. The verification device could perform checks on the secondary blockchain or on particular transactions.

The action could also be performed by a smart contract itself. The latter contract may be the same smart contract referred to above, or it may be a different one. Thus, in the latter case an executing and verifying smart contract are two contracts each of which is published during the set-up phase.

The smart contracts that are recorded in the primary blockchain 210 may be executed by sending an activation transaction to a primary blockchain management device. For example, the activation transaction may be generated at a device, such as secondary blockchain initiation device 160 or a secondary blockchain management device 100. The activation transaction may comprise, e.g., a blockchain identifier of the secondary blockchain, information relating to the action, and an identifier of the smart contract on the primary blockchain. The activation transaction is then sent to a primary blockchain management device, e.g., device 190 or 191. The primary blockchain management device is configured to execute the smart contract based on inputs in the activation transaction and to generate a result. The result is published on the primary blockchain. As can be seen above, there are various devices that can create or execute the smart contracts for various actions. However, after a smart contract has been created and executed on the primary blockchain, anyone can see the execution of the smart contract and its results, e.g., by inspecting the primary blockchain. The trust in the primary blockchain, not only in its cryptographic integrity but also in its production values, such as reliability or availability, may be larger than in the secondary blockchain. This makes it attractive to create a secondary blockchain for relative smaller scale projects. Even though such a secondary blockchain may never achieve the large scale of the primary blockchain, it can use the primary blockchain to increase its own reliability.

Below a particular example of using smart contracts to maintain a secondary blockchain 250 is described. As pointed out above however, many of the operations may be performed at different devices. This makes it possible to create a geographically distributed system.

The exemplifying embodiment described with reference to FIG. 1a comprises a secondary blockchain initiation device 160. Secondary blockchain initiation device 160 may comprise a communication interface 161, similar to the communication interfaces that may be comprised in the other devices of system 180, e.g., such as the blockchain management or use devices. For example, the communication interface may be a computer network interface, e.g., a wired or wireless computer network interface, etc. Secondary blockchain initiation device 160 may comprise a smart contract creation unit 162. Smart contract creation unit 162 is configured to send one or more smart contract creation transactions to a primary blockchain management device. For example, smart contract creation unit 162 may comprise a smart contract repository, e.g., a storage comprising the smart contracts programming code. The smart contract creation unit 162 may generate a smart contract creation transaction which causes the smart contract to be recorded on the primary blockchain 210.

Secondary blockchain initiation device 160 may comprise a blockchain management unit 164. The blockchain management unit 164 is configured to perform an action on the secondary blockchain. For example, blockchain management unit 164 may be configured to generate a genesis block for the secondary blockchain 250. Actions on the secondary blockchain may also, or in fact only, be performed by other entities, e.g., by the secondary blockchain management devices.

Secondary blockchain initiation device 160 may comprise a smart contract activation unit 165. The smart contract activation unit 165 is configured to generate an activation transaction and to send the activation transaction to a primary blockchain management device. Activation unit 165 may for example use the communication interface 161 to send the activation message to the primary blockchain management device, e.g., over a computer network, e.g., over a peer to peer network. The activation message may identify the secondary blockchain, the action that is performed and the smart contract which is to be executed. The smart contract may verify some or all of the action, so that when the smart contract result appears on the primary blockchain, users of the secondary blockchain know that the action has been verified by a reputable source, but also that the secondary blockchain is active. The primary blockchain management devices 195 are configured to execute the smart contract based on input in the activation transaction and to generate a result, and publish the result on the primary blockchain.

The secondary blockchain initiation device 160 may be used in the following exemplifying embodiment of system 180. For example, during the setup phase, the secondary blockchain initiation device, e.g., smart contract creation unit 162, may create one or more smart contracts (SC) on a primary blockchain that supports smart contracts, e.g., Ethereum. For example, a first smart contract SC1 may create a new blockchain; a second smart contract SC2 may validate a block; a third smart contract SC3 closes a blockchain, etc. In an embodiment, a pool of blockchain management devices are provided that are enabled to maintain a new blockchain for the secondary blockchain initiation device. For example, the multiple blockchain management devices 105 may create new blocks, e.g., mine or mint the new blocks. In an alternative embodiment, the multiple blockchain management devices are itself created as a smart contract, e.g., as in FIG. 6c.

There are various options on how to create the smart contracts. For example, in embodiments, the smart contract is configured for multiple actions on the secondary blockchain. The activation message may specify which action is taken. Another option is to create more but smaller smart contracts that are each configured for a different action on the secondary blockchain. For example, the smart contracts SC1, SC2, SC3, etc., may be separate contracts or they may be combined into a single larger contract which incorporates two or more, or each of SC1, SC2, SC3, and/or any other contracts.

For example, secondary blockchain initiation device may operate a portal where a new blockchain can be requested, etc. For example, secondary blockchain initiation device may operate application programming interfaces (APIs) where a new blockchain can be requested, etc.

The secondary blockchain initiation device may perform additional services, such as authenticating the requesting party. For example, the portal may be operated on the internet, e.g., as a website. A user, or an automated process may request at the portal the creation of a new blockchain. This makes it very easy to create a new custom blockchain for various purposes or applications.

I: In an embodiment, the secondary blockchain initiation device 160 might use smart contracts to create a blockchain as follows.

A new genesis block is created; this may be done, e.g., by device 160 or 100 or by a smart contract possibly different from SC1. The genesis block contains at least a blockchain ID to identify the new blockchain. The genesis block can also contain a timestamp or an initial transaction. For example, the initial transaction may comprise the identifying information of the user, device, or organization that initiated the new blockchain. For example, the initial transaction may make use of services providing identification, such as, e.g., MobileConnect, or identification systems or services such as the Dutch eHerkenning, Digid, or other eID info or electronic identification systems or services which may be provided by an organization, that preferably provides a trusted identification service in a secure system. These organizations may vary from local to international organizations, such as government institutions, public organizations, banks or telecom or internet service providers, etc.

The genesis block is sent to the secondary blockchain management devices 105, e.g., through a peer to peer protocol. The secondary blockchain management devices start a new blockchain with the genesis block. The genesis block can be provided with a consensus proof, e.g., by one of the secondary blockchain management devices. In that case, the first block of the secondary blockchain may be the genesis block and the consensus proof.

The secondary blockchain management device also sends an activation transaction to the SC1 on the primary blockchain. The transaction may contain information about the genesis block. All primary blockchain management devices of the primary blockchain execute SC1. For example, SC1 may performs the following program (in pseudo code):

```
IF (activation transaction verifies) THEN
    SC1_result:=all ok.
```

Thus, in an embodiment, the creation of the secondary blockchain, in this case by the secondary blockchain initiation device 160 may be verified. For example, the smart contract SC1 may be configured to authenticate the activation transaction and to publish an indication of said authentication thus indicating the valid creation of the secondary blockchain.

For example, secondary blockchain initiation device 160 may be configured to receive a request to create the secondary blockchain. For example, the request may be received through a website, e.g., a portal. The request may also be received from another device, e.g., in an automated fashion. The request may also be received by interacting with device 160, e.g., through an input device, such as a keyboard. The secondary blockchain initiation device 160 may be configured to obtain the blockchain identifier. For example, the blockchain may be generated, e.g., randomly. For example, the blockchain identifier may be received together with the request. For example, the blockchain identifier may be obtained partly from the request and partly generated, e.g., randomly. The blockchain identifier may comprise a timestamp. Secondary blockchain initiation device 160 may be configured to generate an initiation message comprising the blockchain identifier for the secondary blockchain and sending the initiation message to the multiple secondary blockchain management devices 105 for starting management of the secondary blockchain. For example, both the multiple secondary blockchain management devices 105 and the secondary blockchain initiation device 160 may be arranged by the same entity to facilitate the easy generation of a secondary blockchain. A user who desires a new secondary blockchain does not need to arrange for multiple secondary blockchain management devices, instead he can simply request the generation at the secondary blockchain initiation device 160; as a result, the blockchain is created and multiple secondary blockchain management devices 105 start to manage it, e.g., by receiving transactions and creating new blocks, etc. Anyone can verify that a new secondary blockchain has actually been created by viewing the result of the executing of the first smart contract on the primary block chain. If desirable, one can prevent anyone from executing a smart contract by authentication of the activation transaction, e.g., by verifying a signature. For example, one may restrict execution of the SC1 to only secondary blockchain initiation device 160.

In general, verifying an activation transaction by a smart contract, e.g., the first smart contract, may comprise verifying that the activation transaction originated from the correct device, e.g., from device 160. This may be done by verifying that the transaction has a signature of the correct private key. The verification may also verify that the transaction is syntactically correct, etc.

The primary blockchain management devices may put the activation transaction and the SC1_result in a new block. The winner of the new block gets his block in the blockchain. Thus anyone can verify that SC1 was correctly executed, and anyone can see that the new blockchain, i.e., the secondary blockchain, was created since its blockchain ID is on the primary blockchain, e.g., as part of SC1's input or the activation transaction.

II: To add transactions to the secondary blockchain, a node, e.g., a blockchain use device, may send a transaction to a secondary blockchain management device, probably via a peer to peer network. The transactions are collected in blocks by the secondary blockchain management device. The block may receive a consensus proof as usual. For example, the consensus proof may be a proof of work, e.g., the block is mined. For example, the consensus proof may be a proof of stake, e.g., the block is minted. Some device, e.g., the winning node, or an off-chain application, e.g., run by the secondary blockchain initiation device 160 sends an activation transaction to SC2. This activation transaction contains information about the new block. For example, SC2 may verify the activation transaction. For example, if the block is part of a validated secondary blockchain using a Merkle tree or other blockchain traversal methods and if the verification is correct, SC2 outputs an OK message. SC2 may also output the id of that particular block, and optionally the genesis block id of the corresponding secondary blockchain. The result of SC2 is recorded on the primary blockchain. The activation transaction will also be put on the primary blockchain.

III: To cancel a blockchain is similar to starting a blockchain. The secondary blockchain initiation device may send an activation transaction to SC3, which in this case may be termed a revocation transaction. SC3 verifies the transaction, e.g., that it originated from secondary blockchain initiation device 160. If so, then SC3 puts an OK, or REVOKED+ genesis ID, etc., on the primary blockchain, so that anyone can see that the blockchain identified in the transaction is cancelled, e.g., revoked. Cancelling a blockchain through a smart contract is considered very advantageous. Conventional blockchains are never really cancelled. At any time, a new block could arrive. If the new block satisfies the conditions, e.g., has a valid consensus proof, the blockchain is extended by another block. There is no mechanism to terminate the blockchain, once it is no longer needed. However, according to an embodiment, a blockchain can be terminated by activating a cancelation smart contract. The smart contract verifies that the termination is correct, e.g., by authentication, and records the result in a trusted place, in this case, on the primary blockchain 210.

In an embodiment, the activation transactions may be recorded on the primary blockchain, so that the smart contract can be verified if needed. In all the above examples of smart contracts, the smart contracts may put part of their inputs on the primary blockchain instead of a mere 1-bit ok message, e.g., to show the information was taken into account. Instead of a signature of the secondary blockchain initiation device 160, another authentication means may be used, e.g., a signature by someone else, but with a certificate authorized by the secondary blockchain initiation device 160. For example, any smart contract may be configured to authenticate the activation transaction so that it is verified that the activation transaction originated from one of one or more predetermined trusted parties. For example, each secondary blockchain management device may have a certificate with a public key of that secondary blockchain management device. The secondary blockchain management device has the corresponding private key. The certificate is signed to indicate that the device is a valid secondary blockchain management device. The signature may be verified with a corresponding further certificate. Using certificates has the advantage that the number of secondary blockchain management devices can be extended if needed.

A further action that can be performed on the secondary blockchain is the creation of a blockchain address for a user. The inventors have noted that users of blockchain technology are often unsure whether the recipient of a transaction, e.g., the transfer of a sum of cryptocurrency, really is the intended recipient. A smart contract, say SC4, may be configured to address this problem. The smart contract is configured to authenticate the activation transaction, and to compute a blockchain address from a public key, and to publish an indication of the association between the blockchain address and the user, the activation transaction comprising a public key and an identifier of the user.

For example, an address generation device, which may be the secondary blockchain initiation device 160, may authenticate a client. The address generation device then obtains an address for the client. For example, the address generation device may receive a public key from the client. For example, the address generation device may generate a public/private key pair for the client, and send them to the client. The address generation device then activates a smart contract, say SC4, with a transaction containing: the address, the corresponding public key, an identifier of the client, and a signature of the address generation device. The smart contract SC4 verifies that the address and public key belong to each other, and verifies the signature. If all is well, an OK is put on the primary blockchain. Someone who wants to transfer to the client can look up the address in a trusted way on the primary blockchain. It is not necessary to include the address in the activation transaction, as it can be computed by the smart contract. It is an advantage that the address and client ID are linked to each other on the primary blockchain, since it also indicates that the smart contract was activated by the correct device, e.g., by second blockchain activation device 160. It is implicit that the activation by device 160 implies that device 160 has verified the request, e.g., has verified the client ID.

FIG. 1b shows that system 180 may include one or more blockchain use devices. Shown in FIG. 1b is blockchain use device 150 and blockchain use device 151. The blockchain use devices use the secondary blockchain for some purpose, and may, e.g., generate transactions for inclusion in a future block of the blockchain, or may obtain part of the blockchain to at least partially verify a previous transaction. For example, if the secondary blockchain is used for a cryptocurrency, a blockchain use device may verify that a particular transaction is valid and/or transfer or receive some amount of the crypto currency. There may be more or less blockchain use devices than shown in FIG. 1b. An example, of a blockchain use device 400 which may be employed in system 180 is further disclosed below.

The use devices may also be used to store other transactions than currency transactions, e.g., the transactions may report the transfer of goods. The transactions need not necessarily involve two parties, for example, a transaction may record data on a blockchain, e.g., sensor data and the like.

The computer network 150 may be a peer-to-peer network. For example, messages in system 180, such as transactions, may be sent to part of the devices in system 180, who then forward the message to further devices of system 180. Peer to peer communication may be used by blockchains to initiate the consensus algorithm. Furthermore, peer to peer networking may increase the resiliency of the computer network, but it is not necessary. For example, the devices, e.g., the block management devices, may be programmed with one or more computer network addresses of the other devices in the system, e.g., of the other blockchain management devices. Messages for the primary blockchain, e.g., for the primary blockchain management device need not be shared with the secondary blockchain, e.g., with the secondary blockchain management device, and vice versa.

System 180 may comprise one or more blockchain verification devices. Shown in FIG. 1b is blockchain verification device 170. A blockchain verification device verifies at least part of the blockchain. There may be more or fewer blockchain verification devices than shown in FIG. 1b. An example, of a blockchain verification device 500 which may, e.g., be employed in system 180 is further disclosed below. A blockchain verification device may verify a primary blockchain, a secondary blockchain or both.

Some or all of the devices of system 180 may be integrated. For example, a blockchain verification device may be separate from a blockchain management device, e.g., to distribute these functions over different computers which may even be distributed geographically. However, a blockchain verification device may also advantageously be integrated with a blockchain management device. A blockchain verification device may also be integrated in a blockchain use device, e.g., to perform a more extensive verification at the use device.

A blockchain management device may also be integrated with a blockchain use device. In this case, the device that produces transactions may also be capable of processing such transactions. This has the advantage that blockchain management, e.g., of generating a new block is distributed over more devices.

The various devices of system 180 communicate with each other over a computer network 150. The computer network may be an internet, an intranet, a LAN, a WLAN, etc. Computer network 150 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 180 as needed. For example, the connection interface may comprise a connector, e.g., a wired connector, e.g., an Ethernet connector, or a wireless connector, e.g., an antenna, e.g., a Wi-Fi, 4G or 5G antenna. For example, blockchain management device 100, secondary blockchain initiation device 160, blockchain verification device 500 and blockchain use device 400 may comprise communication interface 110, 161, 510 and 410 respectively. Primary blockchain management device 190 may also comprise a communication interface. Computer network 150 may comprise additional elements, which are not separately shown in FIG. 1b, e.g., a router, a hub, etc. In blockchain management device 100, the communication interface 110 may be used to receive transactions for recording in a blockchain. Transactions may be digital transactions, e.g., received in electronic form.

A blockchain management device, such as blockchain management device 100, may comprise a block constructor 120, a consensus prover 130 and a hash unit 140. Blockchain management device 100 may also comprise a storage, e.g., to store the secondary blockchain. The stored secondary blockchain may be used to verify received transactions. The storage may also store the primary blockchain.

Figure 4:
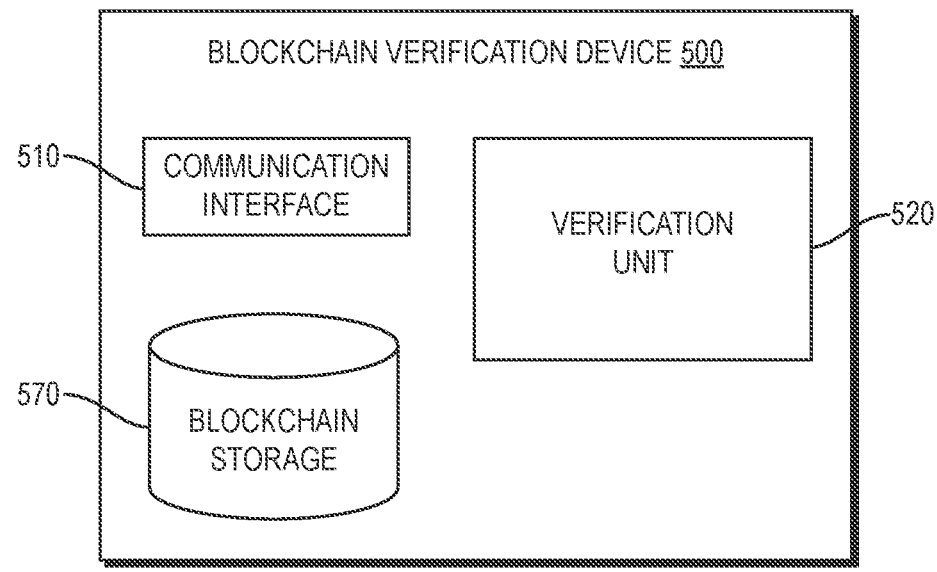
Figure 5:
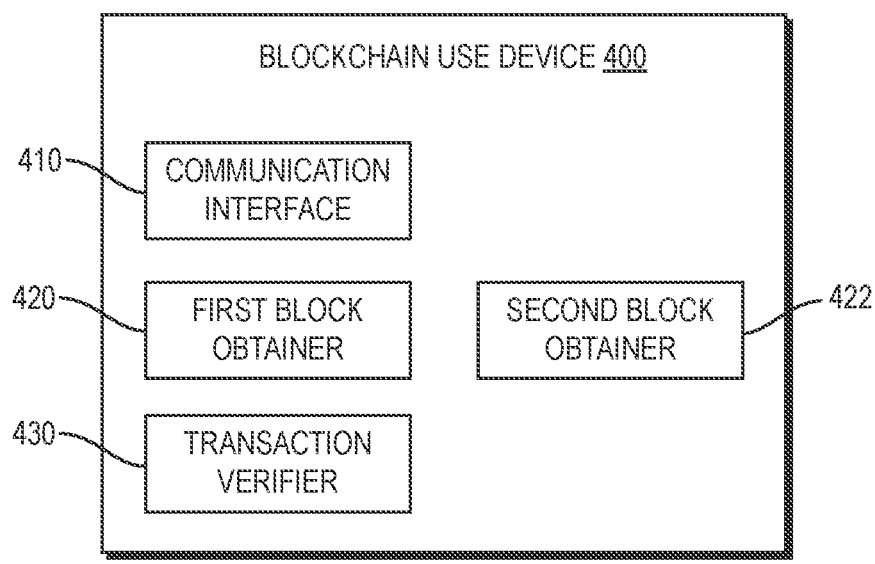

The execution of the blockchain management device 100, but also of, secondary blockchain initiation device 160, primary blockchain management device 190, blockchain verification device 500, and blockchain use device 400 is implemented in a processor circuit, examples of which are shown herein. FIG. 1b, in particular blockchain management device 100, FIG. 4 and FIG. 5 show possible functional units that may be functional units of the processor circuit. For example, FIGS. 1a, 1b, 4 and 5 may be used as a blueprint of a possible functional organization of the processor circuit. The processor circuit is not shown separate from the units in FIGS. 1a, 1b, 4 and 5. For example, the functional units shown in FIGS. 1a, 1b, 4 and 5 may be wholly or partially implemented in computer instructions that are stored at device 100, 160, 190, 400 and 500, e.g., in an electronic memory of the device, and are executable by a microprocessor of the device. In hybrid embodiments, functional units are implemented partially in hardware, e.g., as coprocessors, e.g., crypto coprocessors, and partially in software stored and executed on the device.

Block constructor 120 may be used to construct, e.g., compute, a new block of the secondary blockchain. Over communication interface 110, transactions are received from other elements in system 180, e.g., from blockchain use devices 150 or 151. Block constructor 120 collects a multiple of the received transactions, e.g., it selects them. For example, block constructor 120 may select all transactions that are received in a period. For example, block constructor 120 may prioritize certain transactions, e.g., by type, by origin, etc. Block constructor 120 may also verify the validity of the transactions. For example, in an embodiment in which transactions are signed, block constructor 120 may verify the signatures, and, e.g., discard invalid transactions. Verification and/or selection may be offloaded to a verification device.

In addition to collecting the multiple transactions, the block constructor 120 obtains other parts of the new block, e.g., a consensus proof and a reference to a previous block on the secondary blockchain. The new block is then assembled from at least the multiple transactions, the consensus proof, and a reference to a preceding block on the blockchain. For example, the reference may be to a last block, e.g., the tail block, of the current blockchain. For example, the current secondary blockchain may be stored on a storage of the blockchain management device, although this is not needed. The new block is then communicated to one or more other elements of system 180. The new block is distributed, e.g., to at least a further blockchain management device 101. It is noted that the further blockchain management device, that manages the secondary blockchain, and the blockchain management device that manages the first blockchain may be the same blockchain management device, managing the first blockchain and the second blockchain, and possibly more blockchains.

Consensus prover 130 is arranged to generate a consensus proof over the selected transactions. For example, blockchain management device may comprises an optional hash unit 140 arranged to compute a hash value s over the selected transactions. Hash unit may be configured for a known cryptographic hash function. For example, a hash function from the SHA family, e.g., SHA-256.

The consensus proof may then be computed over the computed hash value or directly over the transactions. Any of the known consensus proofs may be adapted for an embodiment, for example, the consensus proof may comprise a proof of work. For example, the consensus proof may comprise a string x so that a hash function computed over string x and the hash s, e.g., h(x|s), has a particular form, e.g., is numerically below some difficulty target, e.g., the hash starts with a required number of zero's. For example, the consensus proof may comprise consensus from some portion of the network, e.g., it may comprise signatures of one or more further blockchain management devices, e.g., secondary blockchain management devices. For example, consensus prover 130 may be arranged to obtain said digital signatures from the other secondary blockchain management devices over the digital network. For example, the consensus proof may be required to comprise a signature of at least 51% or more of the secondary blockchain management devices. Such signatures may be obtained over the computer network 150. The consensus proof may also require some mix of signatures from secondary and primary blockchain management devices, e.g., 51% of the secondary blockchain management device, and at least 1, or at least 2, etc., of the primary blockchain management devices.

Once the block for the secondary blockchain is completed it may be distributed over system 180, e.g., in a peer to peer fashion. Other blockchain management or verification devices may verify the block and include it in their blockchain. Once new blocks are added to the secondary blockchain which refer to the new block, the trust in the new block is increased, as it becomes increasingly harder to replace the new block with another block. This feature also resolves races. Even if parts of system 180 may adopt one new block while another part adopts another, in time this will be resolved, e.g., using the longest chain rule.

In blockchains the longest chain rule allows nodes, e.g., blockchain management devices to resolve races. It may happen that two blockchain management devices add a block to the blockchain independent from each other. The blockchain thus splits, becoming in essence a block tree. It may even happen that yet further blocks are added, or even further splits. The longest chain rule prescribes which of the blocks becomes part of the blockchain: the active chain is the longest path from the genesis block to a leaf node, e.g., a block at the bottom of the block tree. This chain represents the most accumulated consensus, e.g., the most work. The consensus mechanism makes sure that the chance that two nodes disagree about blocks in the past decreases as the blocks are older. For example, when a new block arrives, and it extends the previous active chain, a blockchain management device may append it to the active chain. If it does not extend the previous active chain, it depends on whether the branch it does extend has more consensus, e.g., more work, e.g., more blocks, than the currently active chain. If not, the block is stored but the current chain is kept active. If it does have more work, a so-called reorganization is done: deactivating blocks from the old branch, and activating blocks from the new branch.

As said, once the new block is finished, e.g., when a consensus proof is available it is distributed, e.g., through communication interface 110, e.g., initiated by block constructor 120 to other devices of blockchain system 180. For example, the new block will be sent to other blockchain management devices, such as blockchain management device 101. However, the new block will eventually reach all interested parties, e.g., verification devices, etc. Here the new block will become part of the secondary blockchain; that is unless it is rejected by the system for some reason, e.g., as a result of the longest chain rule.

Blockchain management device 100 may comprises a primary blockchain transaction unit 125. Primary blockchain transaction unit 125 is optional; its functions may also be performed by other devices. For example, activation of a smart contract in case a new block is created on the secondary blockchain may be performed by, say, secondary blockchain initiation device 160. For example, any device, e.g., secondary blockchain initiation device 160, may monitor the secondary blockchain to see if a block has been added. If so, the device may activate the corresponding smart contract, e.g., SC2. This has the advantage that further conditions may be imposed. For example, the device may wait with activating the smart contract until the new block has reached a predetermined depth, e.g., at least 6 further blocks should have been added after the new block.

Transaction unit 125 is configured to generate an activation transaction to activate a smart contract on the primary blockchain, e.g., smart contract SC2. The activation transaction may comprise an identification of the new block, and in particular of the set of transactions. Transaction unit 125 distributes the activation transaction to at least one primary blockchain management device that manages a primary blockchain, e.g., to primary blockchain management device 190. Note that the overhead of posting an identification in the primary blockchain is much smaller than, e.g., reposting the entire new block of the secondary blockchain in the new block.

There are several ways in which the identification for the transaction can be computed. For example, the activation transaction can comprise an identifier of the new block. For example, the new block may comprise an identifier, e.g., generated by block constructor 120, which may also be comprised in the identification. It is preferable, if the identification is also linked to the transactions in the new block, but not the whole block. For example, in an embodiment, transaction unit 125 is configured to compute a hash, e.g., using hash unit 140 over the new block. The identification may comprise the hash. Alternatively, or additionally, the identification may comprise a hash over the transactions in the new block. An advantage of this identification is that the block is positively identified and cannot be modified in any way. In an embodiment, the identification or at least part thereof is also included in the new block itself. This is possible, for example, if the identification is built from part of the new block and/or from data in a previous block. In an embodiment, the identification is also computed over the consensus proof. For example, the identification may be a hash of set of the transactions, the consensus proof and possibly other metadata, such as an identifier of the new block, an identifier of the block management device etc. The identification may still be included in the new block, since the identification is not computed over the entire new block.

In an embodiment, the identifier comprises a first hash over all or part of the new block, and a second hash. The second hash ensures that the identifier is unique even if exactly the same transactions are processed in a new block as in a previous block. For example, the second hash may be a hash over the previous second hash, e.g., the second hash of the previous block. For example, the second hash may be a hash over the first hash and the previous second hash.

In an embodiment, the identification is computed, e.g., over a hash, over a previous block or more than one block back in the blockchain. For example, the identification may comprise a hash over the previous block, and/or the block before that. For example, there may be a number (e.g. n), say 2, or 3, or more, etc., so that the identification comprises a hash of each of the number (n) of previous blocks in the blockchain. In an embodiment, the identification comprises a Merkle tree of the new block of the secondary blockchain.

Primary blockchain management device 190 is configured to manage a primary blockchain. In an embodiment, a primary blockchain management device may comprise a communication interface arranged to receive digital transactions for recording in a primary blockchain; for example, the transactions may be received from secondary blockchain management devices. The transaction may be creation transaction, which are configured to record a smart contract on the primary blockchain; this functionality may be used during a set-up phase. The transaction may be an activation transaction which configured to execute a smart contract which is recorded on the primary block chain. In an embodiment, the creation and activation messages may be combined. For example, the activation message may also comprise the smart contract which is to be executed, e.g., instead of referring to an existing smart contract.

For example, the activation transaction may comprise an identification, e.g., as explained above. Optionally, the primary blockchain management device may also receive the corresponding new block itself, e.g., in the activation transaction. Preferably, the new block will not be reposted on the primary blockchain device though. This is not necessary, as, say, a hash of a new block uniquely identifies it. For example, the primary blockchain management device may be configured, e.g., through a smart contract, e.g., SC2, to retrieve the new block, e.g., from a particular source which may be identified in the smart contract.

The primary blockchain management device may comprise a processor circuit configured to
obtain a consensus proof for a set of transactions received over the communication interface, one or more of the transactions may be creation or activation transaction related to the secondary blockchain, but one or more of the transactions, or even most, transactions may be transaction which are unrelated to the secondary blockchain, execute smart contracts identified in a received activation transaction and thus generate a smart contract results, assemble a new block for inclusion in the primary blockchain, the new block comprising the set of transactions, the smart contract results, the consensus proof, and a reference to a previous block on the primary blockchain; optional, the device may verify that the block represented by a transaction is correct, e.g., satisfies the legality criteria of the secondary blockchain, e.g., the consensus proof is correct.

distribute the new block over the communication interface to at least one further blockchain management device that manages the primary blockchain.

The primary blockchain management device will include the transaction in a new block of the primary blockchain. This means that a verifier of the secondary blockchain can verify the secondary blockchain in two ways. First of all, the verifier can verify the secondary blockchain in the usual way; for example, the verifier can verify that the blockchains have correct consensus proofs and that each block in the blockchain correctly refers back to its previous block, up to the genesis block. However, the verifier can also verify that the creation of the blocks was recorded in the primary blockchain. For example, the verifier can verify that the block of the secondary blockchain is reflected in an activation transaction on the primary blockchain, and that they are in the correct order, or at least approximately in the correct order, e.g., within a threshold of the correct order. The primary blockchain has an even higher assumption of immutability, and so this improves the trustworthiness of the secondary blockchain.

For example, consider two parties: Bob and Alice, who make a transaction. The transaction is sent to a secondary blockchain management device. The transaction will be included in a new block of the secondary blockchain probably together with many other transactions. Once the block is completed, e.g., the consensus proof is completed, and the new block is distributed, e.g., at least among other secondary blockchain management devices. An activation transaction that proves that the new block was completed is distributed to a primary blockchain management device, who will activate the corresponding smart contract and include the smart contract result and the activation transaction in a block on the primary blockchain. If later a verification device or a use device needs to verify that the transaction took place, the device can verify the block of the secondary blockchain in which the transaction is recorded and/or the block of the primary blockchain in which the block is recorded by the smart contract, e.g., through the block identifier.

In an embodiment, the activation transaction is signed by a private key of the blockchain management device. In an embodiment, the secondary blockchain management device receives payment for one or more or each of the transactions in the new block, e.g., in the form of a crypto currency, the secondary blockchain device may transfer part or all of this payment to the primary blockchain management device that validates his block.

One of the advantages of using a primary blockchain is that a user of the secondary blockchain who is unsure if the secondary blockchain is still being maintained can verify in the primary blockchain if recently blocks have been added to the secondary blockchain. This mechanism may for example be used for private blockchains, which may not be updated frequently. Consider for example, a user of the secondary blockchain who fails to receive new blocks on a secondary blockchain. The user may not be sure if no new block reaches him because of a problem in distribution in the secondary blockchain or because no new block has been created. It is not necessary that for each block on the secondary blockchain an activation transaction is sent to the primary blockchain. For example, an activation transaction may be sent only once every number of secondary blocks, e.g., every other secondary block.

If the primary blockchain does not receive any new information from the secondary blockchain within the expected time, e.g., in a predefined new block creation time, then the status of the secondary blockchain may be set to 'Suspend'. For example, a smart contract may be triggered by certain event. For example, every day a smart contract may be executed on the primary blockchain. The smart contract verifies that a new block has been created on the secondary blockchain, and if so records a status message on the primary blockchain.

As mentioned, embodiments may use the primary blockchain also to record other events of the secondary blockchain through a smart contract. For example, in an embodiment, an initial block in the secondary blockchain is a genesis block, an activation transaction may be distributed to the at least one primary blockchain management device that manages the primary blockchain, said activation transaction comprising an identification of the genesis block, or the genesis block itself, etc. In other word, one can verify on the primary blockchain also that the secondary blockchain was created. It is not necessary that the genesis event is recorded on the primary blockchain. For example, one may start adding transactions to a primary blockchain for an existing secondary blockchain. In that case, newly created blocks can be verified on the primary blockchain, but older blocks cannot.

In an embodiment, the secondary blockchain management device includes in the activation transaction a signature, e.g., with a private key of the secondary blockchain management device. The signature can be verified by the primary blockchain management device to verify that the activation transaction really came from a secondary blockchain management device. For example, the private key may correspond to a public key, e.g., in a certificate, which is known to the primary blockchain management device. This helps against unauthorized, e.g., fraudulent transactions on the primary blockchain device. It is not necessary though.

Figure 8:
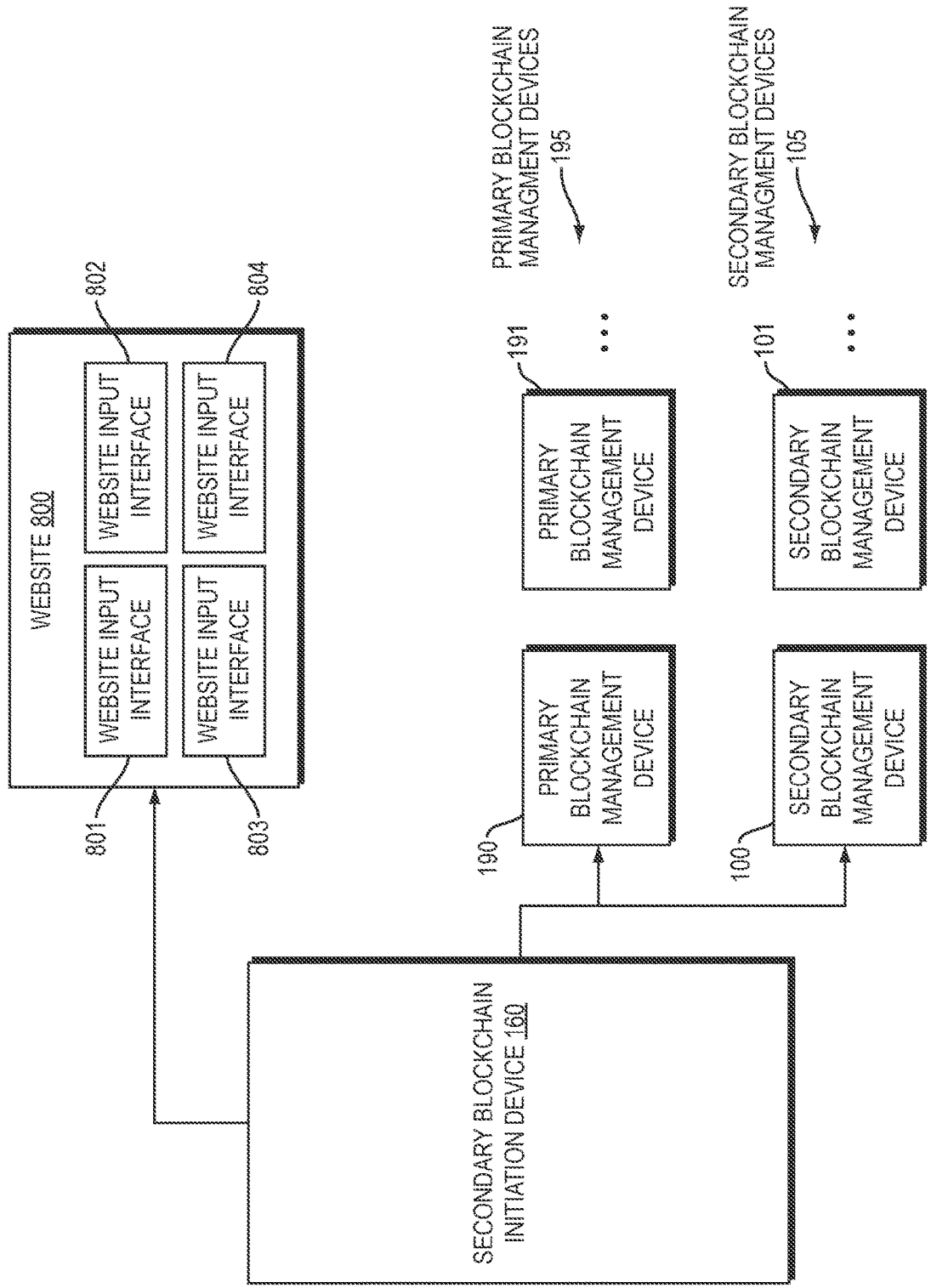

FIG. 8 schematically shows an example of an embodiment of a blockchain system and a website. FIG. 8 illustrates a particular embodiment of system 180 as shown in FIG. 1a. For example, secondary blockchain initiation device 160 may be combined with a web server. Shown in FIG. 8 is a website 800 generated by secondary blockchain initiation device 160. Website 800 offers the possibility to a user to create a new secondary blockchain. The website 800 offers various options for the secondary blockchain. For example, as shown in FIG. 8, the website 800 offers 4 options. For example, at 801 a user may select a consensus proof type, e.g., proof of work, proof of stake, etc.; at 802 a user may select if the secondary blockchain should support smart contract execution, and of what type; at 803 a user may select if the secondary blockchain is a public or private blockchain; at 804 a user may select if the transaction on the new secondary blockchain can only be accepted from known identities or also from anonymous users. There may be more or different or fewer options, etc. Depending on the selections that a user makes, the relevant smart contracts are created or retrieved, and sent to the primary blockchain. Furthermore, the secondary blockchain management devices 105 are informed of the type of blockchain that they need to maintain. Note that the secondary blockchain management devices may support multiple blockchains. The website 800 may be used to inform the user, e.g., of the blockchain id, or of the id of one or more secondary management devices, etc. The website 800 may also be used to perform various other actions, in particular cancelling, e.g., terminating, the blockchain, or suspending the blockchain. Instead of a website, managing secondary blockchain may also be done through APIs.

Figure 2A:
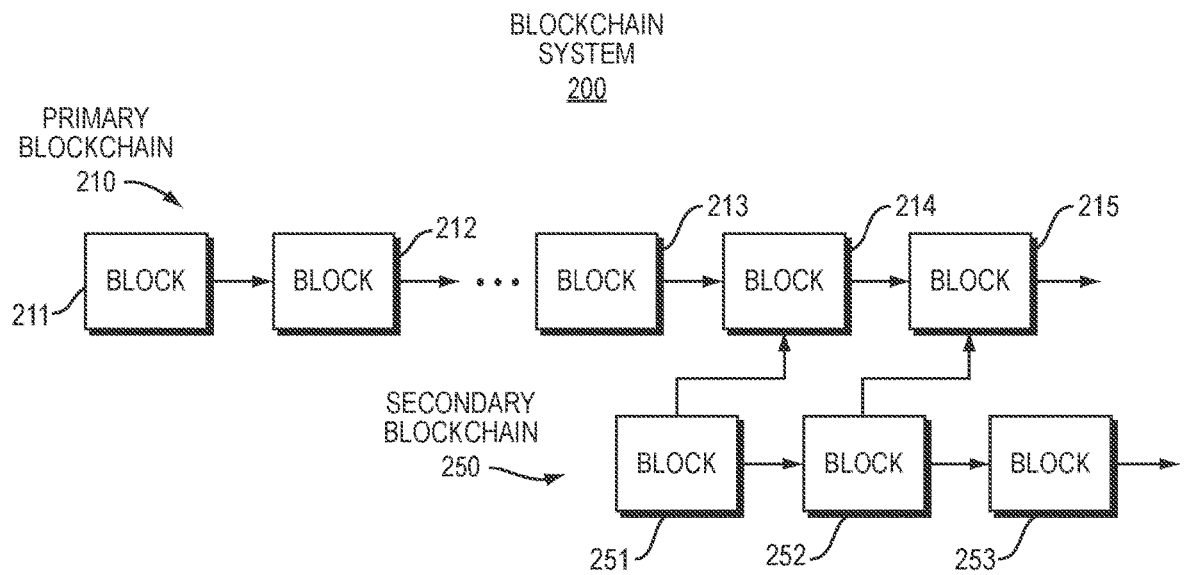

FIG. 2a schematically shows an example of an embodiment of a blockchain system 200. FIG. 2a shows the blockchains used in system 200. For example, these blockchains may also be used for system 180. Shown in FIG. 2a is a primary blockchain 210 and a secondary blockchain 250. There may be more primary and/or secondary blockchains. Primary blockchain 210 comprises multiple blocks; shown are blocks 211, 212, 213, 214 and 215. The first block 211 is known as the genesis block. Each block refers back to the previous block in the chain. This is illustrated with arrows between the blocks. For example, block 212 refers back to block 211, block 214 refers back to block 213, and so on. Referring back can be done in a variety of ways, e.g., by including some part of the previous block, e.g., an identifier or its consensus proof, or value computed over the previous block, e.g., a hash, a signature, etc.

The primary blockchain may have as its primary purpose to validate one or multiple secondary blockchains, such as blockchain 250, but may also primarily be used for something else, e.g., a cryptocurrency or the like. In the latter case, transactions that encode events on the secondary blockchain may be encoded in some manner, e.g., as a fake payment, etc.

For example, in an embodiment a system for recording of transactions is provided, in which the system comprises a primary blockchain management device, and one or more secondary blockchain management devices, the one or more secondary blockchain management devices distributing transactions that indicate a new block on their secondary blockchain to the primary blockchain. For example, use devices may use the system to record transactions, e.g., transactions that transfer or that record data, etc. For example, verification devices may use the system to verify the secondary blockchain using the primary blockchain.

FIG. 2a show a secondary blockchain 250. Of secondary blockchain 250 the blocks 251, 252 and 253 are shown. In both blockchains 210 and 250 there may be more or fewer blocks than shown in FIG. 2a. Locally, secondary blockchain 250 behaves much as a regular blockchain. For example, blockchain 250 comprises a genesis block 251. Moreover, blocks refer back to a previous block, in a similar manner as in blockchain 210, e.g., by including a reference to the previous block. For example, block 252 may comprise a reference to block 251, and so on.

The blocks created on the secondary blockchain 250 are recorded through an activation transaction on primary blockchain 210, as indicated by arrows from blockchain 250 to blockchain 210. For example, after block 252 is created an activation transaction may be generated and sent to a primary blockchain management device. The activation transaction may comprise an identification of block 252 may be recorded in block 215 together with the verification result of the smart contract which is activated by the activation transaction.

When block 253 is created, an activation transaction may be sent, which will be included in a next block of blockchain 210. It may happen, that an activation transaction sent for recordation in a primary blockchain will not immediately show up in the very next block. For example, there may be high traffic on the primary blockchain, which may cause some delay in recording the transaction on the primary blockchain 210. Likewise, the rate at which blocks are created in the primary blockchain may be larger than the rate with which they are created in the secondary blockchain 250. This may lead to there being some blocks on the primary blockchain 210 which do not comprise a reference to a block in the secondary blockchain. The latter possibility is illustrated in FIG. 2d. In FIG. 2d, block 251 and block 252 are recorded in blocks 214 and 215 on the primary blockchain, but there are blocks between blocks 214 and 215.

Another possibility is that not all blocks of the secondary blockchain are recorded in the primary blockchain. This option is illustrated in FIG. 2e. Blocks 251 and 253 of secondary blockchain 250 are recorded as transactions in blocks 213 and 215 on the primary blockchain 210, but block 252 of the secondary blockchain is not recorded. This reduces pressure on the primary blockchain. For a user, the impact is limited though, although he cannot directly verify the creation of block 252 on the primary blockchain 210, he can verify the creation of blocks 251 and 253. Since block 253 refers back to block 251 through block 252 this gives good assurance that block 252 was validly created as well.

Figure 2B:
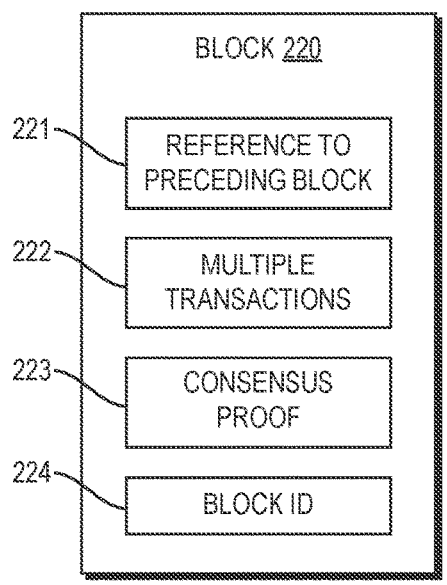
Figure 2C:
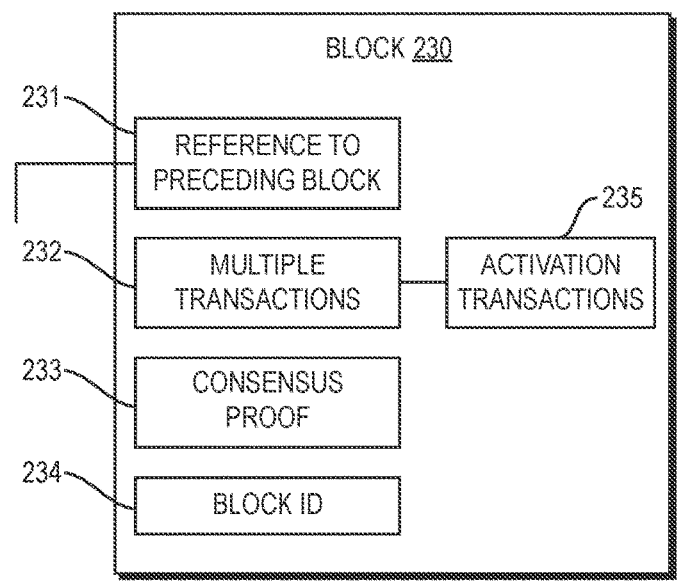
Figure 2D:
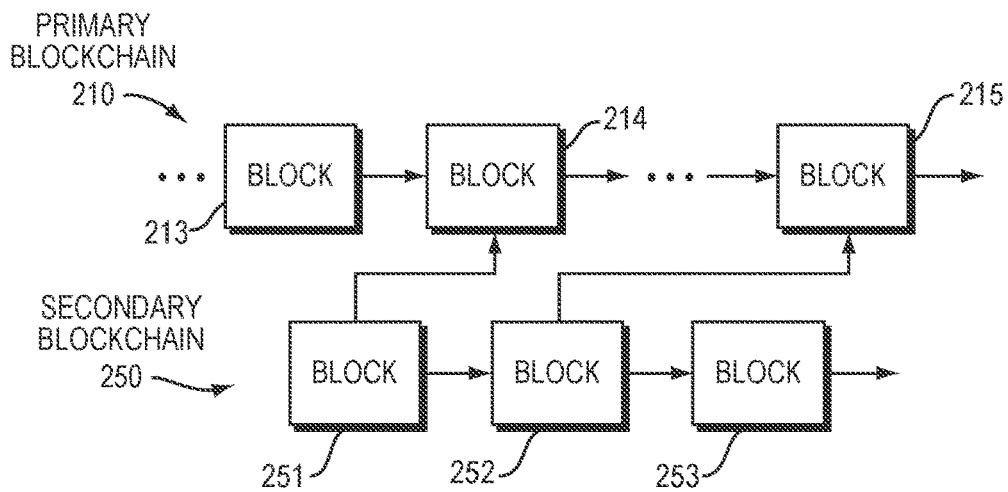
Figure 2E:
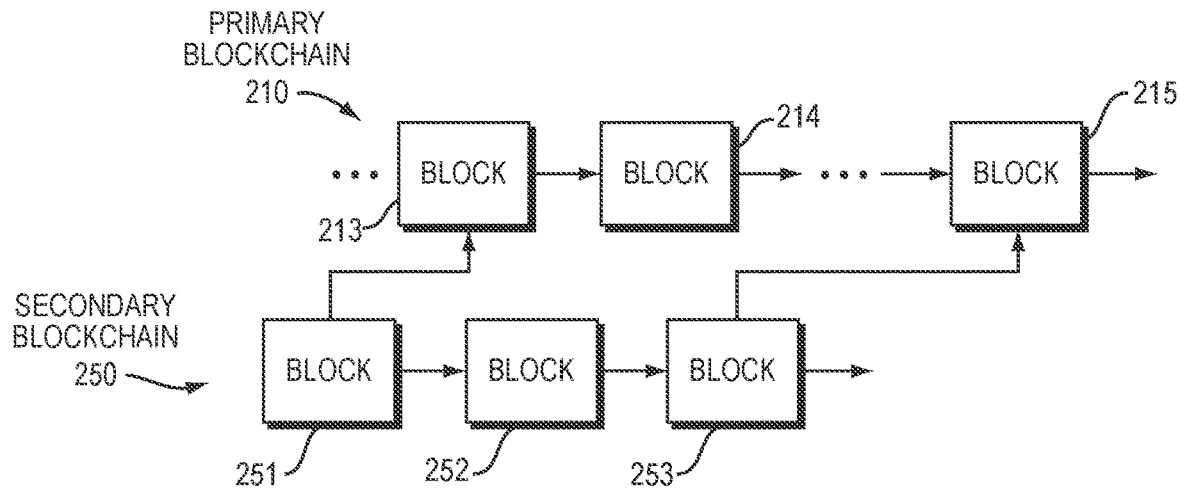
Figure 2F:
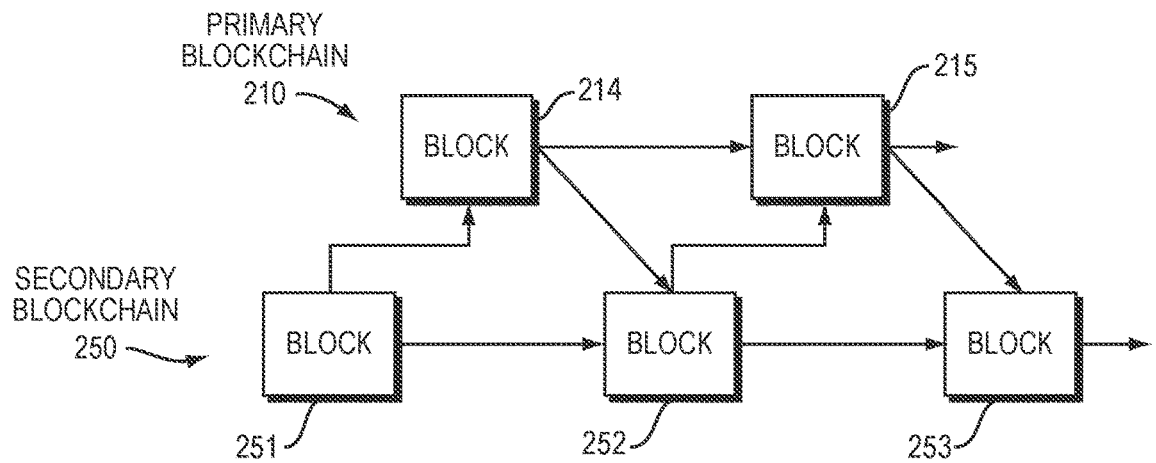
Figure 3:
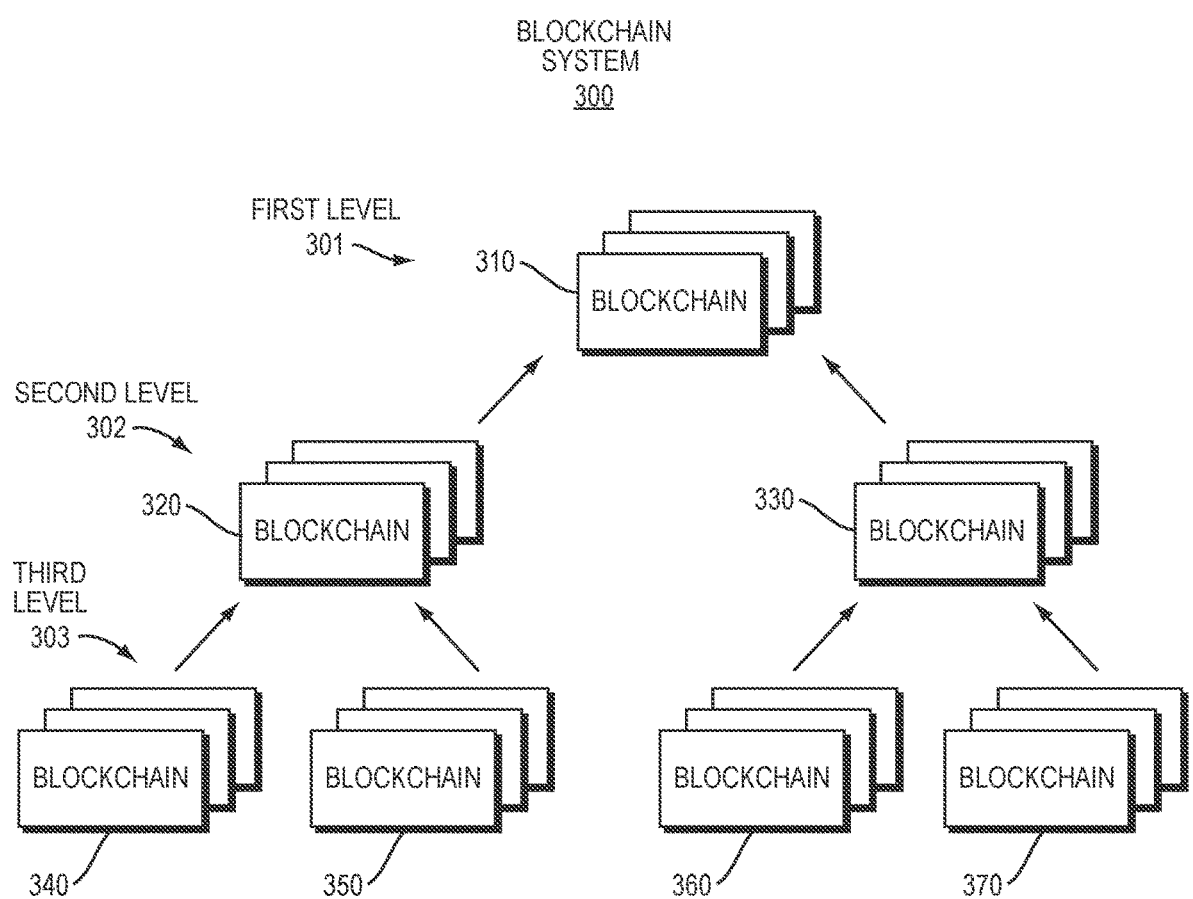

Yet a further option is illustrated in FIG. 2f. In FIG. 2f, blocks of blockchain 250 are recorded on the blockchain 210, e.g., as identifications. In particular, blocks 251 and 252 are recorded as transactions in blocks of the blockchain 210 that are created later, in this case in blocks 214 and 215 respectively. In other words, from the perspective of blockchain 250: blockchain 250 is the secondary blockchain and blockchain 210 is the primary blockchain. However, blockchain 210 may use blockchain 250 to record its blockchain events, e.g., the creation of blocks. In particular, blocks 214 and 215 are recorded as transactions in blocks 252 and 253 respectively. In other words, from the perspective of blockchain 210: blockchain 250 is the primary blockchain and blockchain 210 is the secondary blockchain. In this case, both the primary blockchain management devices and the secondary blockchain management devices are configured to record and execute smart contracts. Smart contracts may have been recorded on both blockchains, e.g., through creation transactions which are sent to both primary and secondary blockchain management devices.

There is no need to restrict this to two blockchains, for example, three or more blockchains could regard each other alternatively as primary or secondary blockchains. For example, in an embodiment, the blockchain management device may be configured to distribute an activation transaction to at least one blockchain management device that manages a primary blockchain, said activation transaction comprising an identification of the set of transactions in the new block, and also arranged to receive a further activation transaction from a different blockchain management device that manages a different blockchain, e.g., the primary blockchain, said activation transaction comprising an identification of the set of transactions in a new block of the different blockchain.

FIG. 2b schematically shows an example of an embodiment of a block 220 which may, e.g., be included in a secondary blockchain, such as blockchain 250.

Secondary blockchain block 220 may comprise, e.g., a set of transactions 222. Set 222 may be empty, e.g., in case block 222 is a default block. Set 222 may comprise one or more transactions. Block 220 may comprise a consensus proof 223. Block 220 may comprise a reference 221 to a previous block on the secondary blockchain. Block 220 may comprise a block id 224, although this is not strictly necessary. There are other things that may or may not be included in block 220. For example, block 220 may comprise the identification, or part thereof, that is recorded on the primary blockchain.

FIG. 2c schematically shows an example of an embodiment of a block 230 which may, e.g., be included in a primary blockchain, such as blockchain 210.

Primary blockchain block 230 may comprise, e.g., a set of transactions 232. Set 232 may be empty or have one or more transactions. One of the transaction in set 232 may be an activation transaction 235 that records the execution of a smart contract, and its result. Activation transaction 235 may cause a smart contract to be executed which verifies the creation of a block on the secondary blockchain, e.g., block 220. Block 230 may comprise a consensus proof 233. Block 230 may comprise a reference 231 to a previous block on the primary blockchain 210. Block 230 may comprise a block id 234, although this is not strictly necessary. There are other things that may or may not be included in block 230.

FIG. 3a schematically shows an example of an embodiment of a blockchain system 300. Embodiments provide a framework for implementing multiple blockchains in a hierarchical manner. Shown in FIG. 3a are three levels: a first level 301, a second level 302, and a third level 303. There may be more or fewer levels.

One blockchain on the first level 301 may be considered the 'Root' and the following one or multiple blockchains may be considered a child of the root and so forth. Shown in FIG. 3a is a root blockchain 310. In FIG. 3a the blockchains are depicted as blocks stacked on top of each other.

In the above picture the 'Root level' blockchain 310 is the one with the higher level in the hierarchy. Below the root blockchain 310, there may be several blockchains that record events, e.g., block creations, in the root blockchain 310. Shown are blockchains 320 and 330 on second level 302. These may be regarded as "Intermediate level" blockchains, and belong to the second level. There may be more blockchains on the second level. There may also be more root level blockchains.

FIG. 3a also shows third level blockchains, on level 303, which may be called the "Issuing level" blockchains belong to the last level. In this example, the blockchains which belong in the "Issuing level" may be the ones providing a service to the end user, but the higher blockchains are providing the information needed in order to assure a variety of attributes that aggregate to trustworthy blockchains.

At least one of blockchains 301 and 302 support the creation and execution of smart contracts. In an embodiment, both of the blockchains 301 and 302 support the creation and execution of smart contracts. For example, blockchain 303 may execute a smart contract on blockchain 302 to verify and record blocks on blockchain 303, and/or blockchain 302 may execute a smart contract on blockchain 301 to verify and record blocks on blockchain 302.

Blockchains may provide a means of executing transactions between untrusted partners without the need of a central authority. Using multiple blockchains, a blockchain verification device and/or smart contracts does not conflict with that. For example, the root blockchain may be a blockchain for which the participants or the ecosystem agree that it can function as the primary blockchain. For example, the Bitcoin network can be used as root blockchain, or the public Ethereum network, etc. Any of the blockchains could be public or private, in particular the secondary ('intermediate') or third ('issuing') can be either public or private blockchain implementations. An example of a use case is the following. A company may want to use Bitcoin transactions as the payment system, a private blockchain based on Ethereum for the logistics and a third blockchain for the validation of the whole process. The primary and/or secondary blockchain could be run as a service, e.g., to assure the validity of a public or private blockchain.

For example, in an embodiment using three levels, the root level may be a public blockchain, e.g., e well-known blockchain, the second level may be a service providing company that provides validation services for blockchains. The third level may be blockchains of clients of the service providing company. Typically, the latter will be private blockchains, the second level blockchains may be public or private.

A multilayered solution is thus presented in order for a secondary blockchain to be able to register its contents on a primary blockchain. This gives then a third party (an end client or a process for example) the opportunity to check if the data received or presented (depends on the type of application) from the secondary blockchain is trustworthy. An end customer can check if the data is valid by running a check in the primary blockchain which might only hold the hashes of blocks from secondary blockchains thus acting as the checkpoint for all interested parties.

An example of this application is the following: Company A buys mobile devices from company B and then sells them to consumers. A consumer visits one of the shops of company A and wants to check the production date of a mobile device. She scans the barcode (or IMEI or any other distinct identity) and a check is done on her behalf. This check involves checking the hashed data of the secondary blockchain of company A with the data stored in the root blockchain of company B. If the data is valid, the correct date is shown to the end customer. Embodiments may be applied in supply chains.

FIG. 4 schematically shows an example of an embodiment of a blockchain verification device 500. In addition to the communication interface 510, blockchain verification device 500 comprises a verification unit 520, and a blockchain storage 570. The blockchain storage 570 comprises the current state of the blockchain. In particular, storage 570 may comprise both the primary and secondary blockchain, e.g., chains 210 and 250.

In an embodiment, blockchain verification device 500 is arranged with a blockchain browser. The blockchain browser providing a user interface for browsing the blockchains. The user interface may also receive a request to search for transactions, and the like. In an embodiment, blockchain verification device 500 may be arranged to receive requests for part of the blockchains. For example, a blockchain use device may request blocks of the blockchains.

For example, blockchain verification device 500 may be configured to receive new blocks, e.g., from blockchain management devices, verify the blocks and store them in the blockchain storage 570. Blockchain verification device 500 may employ some tie-breaking rule in case multiple conflicting blocks are received. The tie breaking may be the so-called longest chain rule.

The verifying of verification unit 520 may comprise the conventional verification checking for the blockchains: For example, verifying the consensus proof, verifying that first and second halves of transactions correctly execute as blockchain scripts, and so on. Verification unit 520 may also perform verification specific to multiple blockchains. For example, after receiving a block of the primary blockchain, verification unit 520 may determine if the block comprises an activation transaction and smart contract result that indicates a new block on the secondary block. For example, a block from the secondary blockchain can be used to compute the identification of the secondary block. The verification device may verify that the identification is present in an activation transaction and smart contract result of the primary block. In that case, the blockchain may verify if the corresponding secondary block actually exits. Depending on the application, verification device 500 may, e.g., reject a block on primary blockchain having such a transaction as illegal, and refuse to add it to the primary blockchain. In an embodiment, device 500 may have a block pool for temporarily keeping a block of the primary blockchain, since it may happen that the primary block with the activation transaction is received before the corresponding secondary block. Likewise, if device 500 receives a secondary block, verification unit 520 may verify that a corresponding activation transaction is recorded on the primary blockchain. Also in this case, a secondary block should not immediately be discarded but also kept for some period, since the corresponding primary block may arrive some time later. For example, the pool may keep the primary or secondary blocks for an hour or more, or a day or more, etc. Discarded blocks may be kept if desired, e.g., in an archive.

Verification device 500 may further execute smart contracts itself and verify that the smart contract results on the primary blockchain are correct.

FIG. 5 schematically shows an example of an embodiment of a blockchain use device 400. In addition to the communication interface 410, device 400 comprises a block obtainer 420, and a transaction verifier 430. Blockchain use device 400 may be configured to perform only minimal verification before accepting a transaction. For example, use device 400 may receive a transaction, e.g., from another blockchain use device. The transaction may comprise a transaction input referring to an earlier transaction. For example, the transaction transfers currency or some other goods to an account under control of the owner of the blockchain use device 400. Blockchain use device 400 is arranged to verify that the transaction input, e.g., to verify that the transaction is actually correct, and not, e.g., a double spending.

For example, block obtainer 420 may be configured to obtain at least part of a block from a secondary blockchain comprising said earlier transaction. The block may comprise multiple transactions including the earlier transaction, and a consensus proof. Instead of a full block also part of the block may be received, e.g., together with a corresponding partial hash, e.g., according to a Merkle tree. Using the received block, the validity of the transaction can be verified. Block obtainer 420 may also obtain at least part of a block from a primary blockchain comprising an identification of the block of the secondary blockchain, verify the validity of the block from the secondary blockchain using the obtained part of the block from the first blockchain. For example, in an embodiment, the block from the secondary blockchain is received in full, but the block from the primary blockchain is received only in part, e.g., using a Merkle tree. In this case, the full block from the secondary blockchain can be used to compute the identification of the secondary block. The use device may verify that the identification is present in an activation transaction of the primary block together with a positive result smart contract result, e.g., an ok result. The blockchain use device may be arranged to derive the identification based on the block from the secondary blockchain, e.g., as a hash over at least the set of transactions. However, there may be various ways to find the corresponding block in the primary blockchain, e.g., a timestamp, a block Id, etc.

In the various embodiments of the blockchain management device 100, blockchain verification device 500, blockchain use device 400, secondary blockchain device 190, and secondary blockchain initiation device 160, the communication interface may be selected from various alternatives. For example, the communication interface may be a network interface to a local or wide area network, e.g., the Internet. Alternatively, a system 180 may be implemented over other technology. For example, communication interface may be a storage interface to an internal or external data storage, an application interface (API), etc.

The blockchain management device 100, blockchain verification device 500, blockchain use device 400, secondary blockchain device 190, and secondary blockchain initiation device 160 may have a user interface, which may include well-known elements such as one or more buttons, a keyboard, display, touch screen, etc. The user interface may be arranged for accommodating user interaction for performing, e.g., a transaction, a verification, a block management.

Storage, e.g., for storing a blockchain may be implemented as an electronic memory, say a flash memory, or magnetic memory, say hard disk or the like. Storage may comprise multiple discrete memories together making up storage. Storage may also be a temporary memory, say a RAM. In the case of a temporary storage, storage contains some means to obtain data before use, say by obtaining them over an optional network connection (not shown).

Typically, blockchain management device 100, blockchain verification device 500, blockchain use device 400, secondary blockchain device 190, and secondary blockchain initiation device 160 each comprise a microprocessor (not separately shown in FIGS. 1*a*, 1*b*, 4 and 5) which executes appropriate software stored at the device; for example, that software may have been downloaded and/or stored in a corresponding memory, e.g., a volatile memory such as RAM or a non-volatile memory such as Flash (not separately shown). Alternatively, the blockchain management device 100, blockchain verification device 500, blockchain use device 400, secondary blockchain device 190, and secondary blockchain initiation device 160 may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, the devices are implemented as one or more circuits. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figures 6A, 6B, 6C:
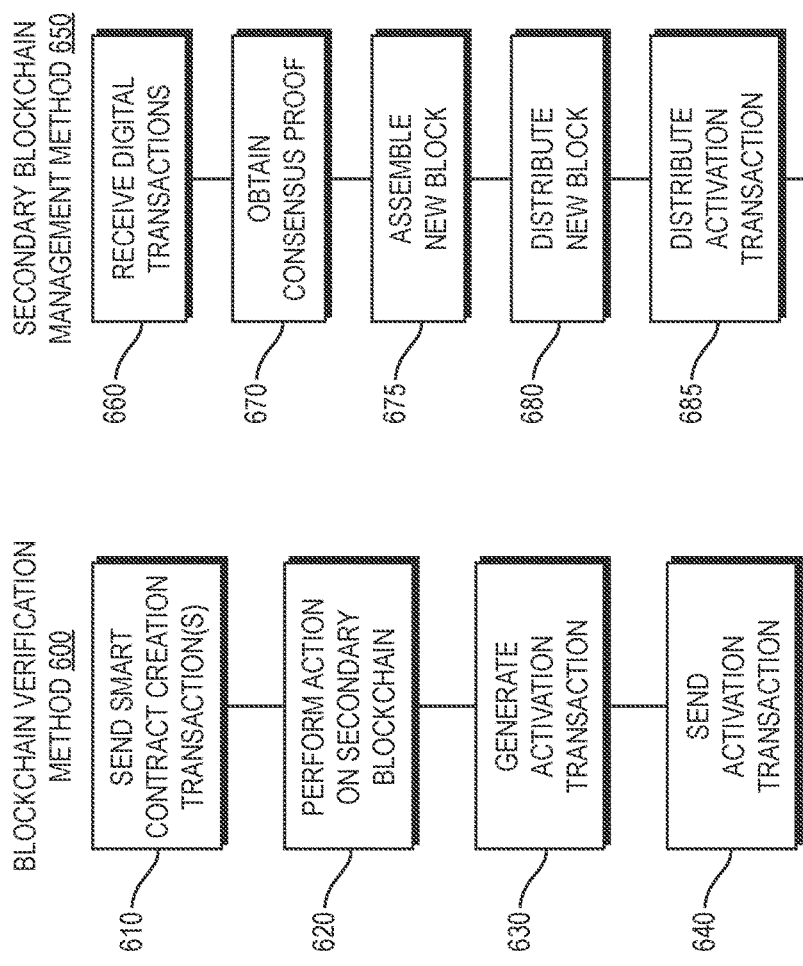

FIG. 6*a* schematically shows an example of an embodiment of a blockchain verification method 600. The method may be executed on a device such as secondary blockchain initiation device 160 or on a secondary blockchain management device. Method 600 may also be executed on a verification device 500. Blockchain verification method (600) comprises sending (610) one or more smart contract creation transactions to a primary blockchain management device which is configured to manage a primary blockchain, the smart contract creation transaction comprising a smart contract for performing verification of an action on a secondary blockchain, the primary blockchain management device being configured to publish the smart contract in a block of the primary blockchain, performing (620) the action on the secondary blockchain, generating (630) an activation transaction comprising at least a blockchain identifier of the secondary blockchain, information relating to the action, and an identifier of the smart contract on the primary blockchain, sending (640) the activation transaction to a primary blockchain management device which is configured to manage the primary blockchain, the primary blockchain management device being configured to execute the smart contract based on input in the activation transaction generating a result, and publish the result on the primary blockchain.

Method 600 can be executed distributed over multiple different device. For example, the step of sending 610, performing 620, generating 630 or sending 640 may be done on different devices. For example, sending 610 may be done on a first device. For example, performing 620, generating 630 and sending 640 may be done on a second device. For example, generating 630 and sending 640 may be done on a single device, which does not do the sending and performing. The latter may, e.g., be done in a monitoring device; e.g., in a device which monitors the secondary blockchain for actions performed on it.

FIG. 6*b* schematically shows an example of an embodiment of a secondary blockchain management method (650). For example, the method 650 may be executed on a secondary blockchain management device 100. The secondary blockchain management method (650) comprises receiving (660) digital transactions for recording in a secondary blockchain, obtaining (670) a consensus proof for a set of transactions received over the communication interface, assembling (675) a new block for inclusion in the secondary blockchain, the new block comprising the set of transactions, the consensus proof, and a reference to a previous block on the secondary blockchain, distributing (680) the new block over the communication interface to at least one further blockchain management device that manages the secondary blockchain, distributing (685) an activation transaction to at least one blockchain management device that manages a primary blockchain, said transaction comprising an identification of the set of transactions in the new block, generating (690) an activation transaction comprising an identifier of the smart contract on the primary blockchain, and an identification of the set of transactions in the new block, sending (695) the activation transaction to a primary blockchain management device which is configured to manage the primary blockchain, the primary blockchain management device being configured to execute the smart contract based on input in the activation transaction generating a result, and publish the result on the primary blockchain.

FIG. 6c schematically shows an example of an embodiment of a smart contract 750 for managing a secondary blockchain.

As pointed out above off-chain blockchain management devices may be configured to generate new blocks for the secondary blockchains. A smart contract on the primary blockchain may be activated, e.g., by an oracle, so that this event is recorded and/or verified on the primary blockchain. For example, such a smart contract may be executed on a primary blockchain management device. The smart contract may be configured for performing verification of an action on a secondary blockchain based at least on input in an activation transaction. For example, the activation transaction may comprise authentication information which may be verified by the smart contract. The smart contract is configured to generate a result and to publish the result on the primary blockchain. The latter may be implicit. For example, the primary blockchain management devices may be configured to publish any result, possibly within some restrictions, on the primary blockchain.

Smart contract 750 takes support from a primary blockchain for a secondary blockchain yet a step further. Smart contract 750 not only records the new block but also generates the new block of the secondary blockchain, even though smart contract 750 is executed on the primary blockchain. The blocks of the secondary blockchain may then appear as part of the primary blockchain. Some off-chain support for the smart contract may be still be used though, e.g., to collect transactions that are to be included in the new secondary block.

As pointed out above, some modern blockchain technologies support smart contracts in a general-purpose language, such as Java or C #. This provides the interesting possibility to implement a blockchain management device, e.g., a 'miner' or a 'minter', as a smart contract. The result is that such a blockchain management device would automatically execute on all primary blockchain management devices. Moreover, the new block of the secondary blockchain would be published as part of a block of the primary blockchain.

For example, as above the smart contract may be published on the primary blockchain and/or activated by a device such as secondary blockchain initiation device 160.

The smart contract may comprise smart contract programming code for each of the following elements:

receiving (760) digital transactions for recording in a secondary blockchain, obtaining (770) a consensus proof for a received set of transactions assembling (775) a new block for inclusion in the secondary blockchain, the new block comprising the set of transactions, the consensus proof, and a reference to a previous block on the secondary blockchain, recording (780) the new block of the secondary blockchain in a block of the primary blockchain.

For example, smart contract 750 may be triggered by oracle software which monitors the secondary blockchain. For example, the oracle software may collect and forward transactions for recording on the secondary blockchain. The oracle software may be run on an oracle device, e.g. comprising a processor circuit and memory arranged for the oracle software. For example, the secondary blockchain initiation device may act as the oracle. For example, a secondary blockchain management device may be used as an oracle. In the latter case, the functionality to create blocks off-chain may or may not be removed from the secondary blockchain management device, e.g., for this blockchain.

For example, sending the transaction for step 760 may be done by sending the transaction to a primary blockchain management device, e.g., referencing the smart contract of FIG. 6c. Obtaining the consensus proof may execute proof of work or proof of stake protocols, and the like. Once the transactions are known and the consensus proof is obtained the new block can be assembled. A reference to the previous block can be obtained by looking up the previous block of the secondary blockchain on the primary blockchain. Finally, the output of the smart contract can be recorded in the new block of the primary blockchain. The recording 780 may be implicit in a smart contract; for example, the output of a smart contract may always be registered on the primary blockchain.

The smart contract may be running on multiple primary blockchain management devices, as is usual with smart contracts. However, only the new block generated by the winning primary blockchain management devices would actually be recorded in the primary blockchain. Thus, the normal mechanisms for avoiding splits, e.g., the longest chain rule, that operate on the primary blockchain automatically avoid splits in the secondary block chain.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

A method according to the invention may be executed using software, which comprises instructions for causing a processor system to perform methods 600 and 650. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
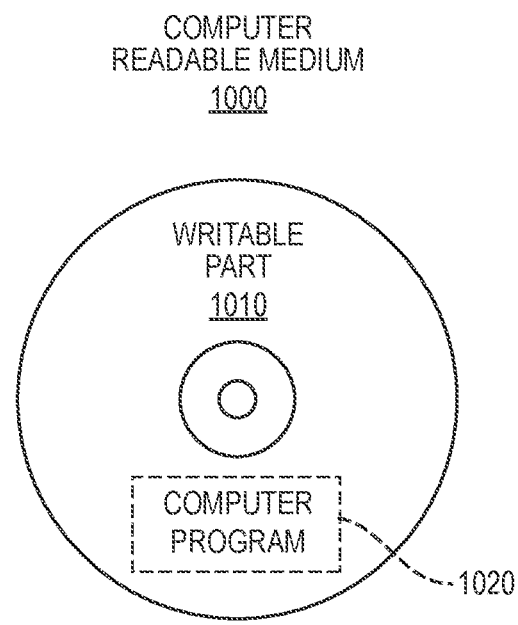

FIG. 7a shows a computer readable medium 1000 having a writable part 1010 comprising a computer program 1020, the computer program 1020 comprising instructions for causing a processor system to perform a blockchain verification method or a secondary blockchain management method according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said blockchain verification method or said secondary blockchain management method.

Figure 7B:
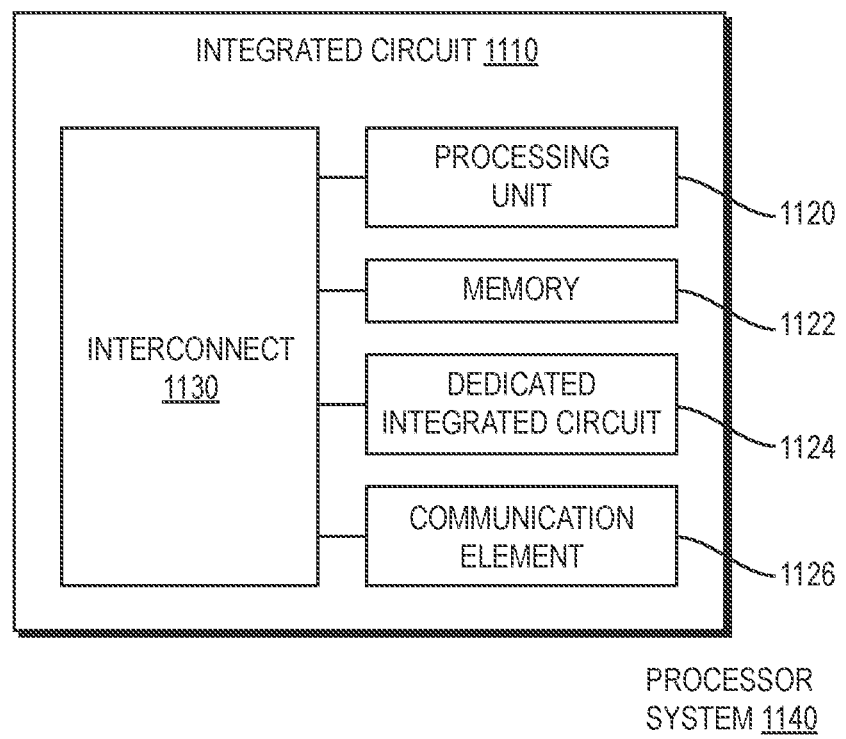

FIG. 7b shows in a schematic representation of a processor system 1140 according to an embodiment of a secondary blockchain initiation device or a secondary blockchain management device. Processor system 1140 may be configured to execute a method according to an embodiment, or at least the part of the method which is executed at a single device.

The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the secondary blockchain initiation device or a secondary blockchain management device, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A blockchain verification method, the blockchain verification method comprising:
by a blockchain initiation device:
receiving a request to create a secondary blockchain;
obtaining a blockchain identifier of the secondary blockchain;
sending one or more smart contract creation transactions to a primary blockchain management device which is configured to manage a primary blockchain, the primary blockchain being a public blockchain, the smart contract creation transaction comprising a smart contract for performing verification of an action on the secondary blockchain, the secondary blockchain being a private blockchain different from the primary blockchain, the primary blockchain management device being configured to publish the smart contract in a block of the primary blockchain;
performing the action on the secondary blockchain, wherein the action performed on the secondary blockchain is the creation of the secondary blockchain;
generating an activation transaction comprising at least the blockchain identifier of the secondary blockchain, information relating to the action, and an identifier of the smart contract on the primary blockchain;
sending the activation transaction to the primary blockchain management device which is configured to manage the primary blockchain, the primary blockchain management device being configured to execute the smart contract based on input in the activation transaction generating a result, and publish the result on the primary blockchain, wherein the smart contract is configured to authenticate the activation transaction and to publish an indication of said authentication thus indicating valid creation of the secondary blockchain;

generating an initiation message comprising at least the blockchain identifier for the secondary blockchain and sending the initiation message to multiple secondary blockchain management devices for starting management of the secondary blockchain.

2. A blockchain verification method as in claim 1, wherein the a further action performed is the creation of a new block on the secondary blockchain, the smart contract being configured to verify the new block of the secondary blockchain, the method further comprising:
collecting transactions for recording on the secondary blockchain, and generating the new block for the secondary blockchain comprising a set of collected transactions, the activation transaction comprising information relating to the generated new block.

3. A blockchain verification method as in claim 1, wherein a further action performed is the creation of a blockchain address for a user, the smart contract being configured to authenticate the activation transaction, to compute the blockchain address from a public key, and to publish an indication of the association between the blockchain address and the user, the activation transaction comprising the public key and an identifier of the user.

4. A blockchain verification method as in claim 1, wherein a further action performed is the cancelation of the secondary blockchain, the smart contract being configured to authenticate the activation transaction and to publish an indication of said authentication thus indicating the cancelation of the secondary blockchain.

5. A blockchain verification method as in claim 1, wherein:
the smart contract is configured for multiple actions on the secondary blockchain, or
multiple different smart contracts are configured for multiple different actions on the secondary blockchain.

6. A blockchain verification method as in claim 1, wherein the smart contract is configured to authenticate the activation transaction so that it is verified that the activation transaction originated from one of one or more predetermined trusted parties.

7. A blockchain verification method as in claim 1, wherein the secondary blockchain management devices are configured to obtain a consensus proof for a set of transactions included in a new block of the secondary blockchain.

8. A blockchain verification method as in claim 1, wherein a secondary blockchain verification device is configured to send the one or more smart contract creation transactions, and to perform at least one of the actions of creating or cancelling the secondary blockchain.

9. A secondary blockchain initiation device comprising:
a communication interface arranged to communicate at least with a primary blockchain management device;
a processor circuit configured to:
receive a request to create a secondary blockchain;
obtain a blockchain identifier of the secondary blockchain;
send one or more smart contract creation transactions to a primary blockchain management device which is configured to manage a primary blockchain, the primary blockchain being a public blockchain, the smart contract creation transaction comprising a smart contract for performing verification of an action on the secondary blockchain, the secondary blockchain being a private blockchain different from the primary blockchain, the primary blockchain management device being configured to publish the smart contract in a block of the primary blockchain;
perform the action on the secondary blockchain, wherein the action performed on the secondary blockchain is the creation of the secondary blockchain;
generate an activation transaction comprising at least the blockchain identifier of the secondary blockchain, information relating to the action, and an identifier of the smart contract on the primary blockchain;
send the activation transaction to a primary blockchain management device which is configured to manage the primary blockchain, the primary blockchain management device being configured to execute the smart contract based on input in the activation transaction generating a result, and publish the result on the primary blockchain, wherein the smart contract is configured to authenticate the activation transaction and to publish an indication of said authentication thus indicating valid creation of the secondary blockchain;
generate an initiation message comprising at least the blockchain identifier for the secondary blockchain and sending the initiation message to multiple secondary blockchain management devices for starting management of the secondary blockchain.

10. A non-transitory computer readable medium comprising non-transitory data representing instructions to cause a processor system to perform:
receiving a request to create a secondary blockchain;
obtaining a blockchain identifier of the secondary blockchain;
sending one or more smart contract creation transactions to a primary blockchain management device which is configured to manage a primary blockchain, the primary blockchain being a public blockchain, the smart contract creation transaction comprising a smart contract for performing verification of an action on the secondary blockchain, the secondary blockchain being a private blockchain different from the primary blockchain, the primary blockchain management device being configured to publish the smart contract in a block of the primary blockchain;
performing the action on the secondary blockchain, wherein the action performed on the secondary blockchain is the creation of the secondary blockchain;
generating an activation transaction comprising at least the blockchain identifier of the secondary blockchain, information relating to the action, and an identifier of the smart contract on the primary blockchain;
sending the activation transaction to the primary blockchain management device which is configured to manage the primary blockchain, the primary blockchain management device being configured to execute the smart contract based on input in the activation transaction generating a result, and publish the result on the primary blockchain, wherein the smart contract is configured to authenticate the activation transaction and to publish an indication of said authentication thus indicating valid creation of the secondary blockchain;
generating an initiation message comprising at least the blockchain identifier for the secondary blockchain and sending the initiation message to multiple secondary blockchain management devices for starting management of the secondary blockchain.

* * * * *